(12) United States Patent
Lee et al.

(10) Patent No.: US 12,374,496 B2
(45) Date of Patent: Jul. 29, 2025

(54) MULTILAYER ELECTRONIC COMPONENT

(71) Applicant: SAMSUNG ELECTRO-MECHANICS CO., LTD., Suwon-si (KR)

(72) Inventors: Kangha Lee, Suwon-si (KR); Wookyung Sung, Suwon-si (KR); Jin Hyung Lim, Suwon-si (KR); Sin Il Gu, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 431 days.

(21) Appl. No.: 17/893,539

(22) Filed: Aug. 23, 2022

(65) Prior Publication Data

US 2023/0253156 A1 Aug. 10, 2023

(30) Foreign Application Priority Data

Feb. 7, 2022 (KR) .................. 10-2022-0015555

(51) Int. Cl.
*H01G 4/232* (2006.01)
*H01G 4/30* (2006.01)

(52) U.S. Cl.
CPC .............. *H01G 4/2325* (2013.01); *H01G 4/30* (2013.01)

(58) Field of Classification Search
CPC ........ H01G 4/2325; H01G 4/30; H01G 4/012; H01G 4/12; H01G 4/1227; H01G 4/232; H01G 2/06; H01G 4/002; H01G 4/005; H01G 4/0085
See application file for complete search history.

(56) References Cited

U.S. PATENT DOCUMENTS

| 10,770,237 B2* | 9/2020 | Son ...................... H01G 4/30 |
| 11,587,735 B2* | 2/2023 | Park ...................... H01G 4/008 |
| 2008/0247120 A1* | 10/2008 | Mori ...................... H01G 9/0425 361/523 |
| 2009/0268374 A1* | 10/2009 | Motoki ...................... H01G 4/30 361/321.2 |

(Continued)

FOREIGN PATENT DOCUMENTS

| JP | 2009-246052 A | 10/2009 |
| KR | 10-2017-0114138 A | 10/2017 |

*Primary Examiner* — Dion R. Ferguson
(74) *Attorney, Agent, or Firm* — MORGAN, LEWIS & BOCKIUS LLP

(57) ABSTRACT

A multilayer electronic component, may include: a body including a dielectric layer and first and second internal electrodes alternately disposed with the dielectric layer interposed therebetween, the body having first and second surfaces opposing each other, third and fourth surfaces opposing each other, and fifth and sixth surfaces opposing each other, the first surface including first and second band electrodes disposed to be spaced apart from each other; a first external electrode disposed on the third surface and connected to the first internal electrode and the first band electrode; a second external electrode disposed on the fourth surface and connected to the second internal electrode and the second band electrode; a first plating layer disposed on the first external electrode and the first band electrode; and a second plating layer disposed on the second external electrode and the second band electrode.

33 Claims, 28 Drawing Sheets

(56) References Cited

U.S. PATENT DOCUMENTS

| | | | |
|---|---|---|---|
| 2013/0208401 A1* | 8/2013 | Shirakawa | H01G 13/06 216/13 |
| 2015/0084481 A1* | 3/2015 | Mori | H01G 4/252 29/829 |
| 2015/0279562 A1* | 10/2015 | Nishisaka | H01G 4/1227 361/301.4 |
| 2017/0162328 A1* | 6/2017 | Ota | H01F 27/24 |
| 2017/0287640 A1* | 10/2017 | Choi | H01G 4/30 |
| 2018/0114644 A1* | 4/2018 | Sugita | H01G 4/12 |
| 2019/0131076 A1* | 5/2019 | Fukumura | H01G 4/232 |
| 2019/0180941 A1* | 6/2019 | Choi | H01G 4/30 |
| 2019/0279821 A1* | 9/2019 | Park | H01G 4/30 |
| 2020/0152387 A1* | 5/2020 | Takeuchi | H01G 4/1245 |
| 2020/0234885 A1* | 7/2020 | Yatagawa | H01G 4/30 |
| 2021/0217560 A1* | 7/2021 | Kim | H01G 4/1218 |
| 2021/0233716 A1* | 7/2021 | Oh | H01G 4/30 |
| 2021/0265114 A1* | 8/2021 | Park | H01G 4/248 |
| 2022/0093337 A1* | 3/2022 | Han | H01G 4/232 |
| 2022/0148813 A1* | 5/2022 | Lee | H01G 4/1218 |
| 2022/0208462 A1* | 6/2022 | Kim | H01G 4/30 |
| 2023/0215653 A1* | 7/2023 | Kim | H01G 4/008 361/301.4 |
| 2023/0253156 A1* | 8/2023 | Lee | H01G 4/30 361/301.4 |

* cited by examiner

MULTILAYER ELECTRONIC COMPONENT

CROSS-REFERENCE TO RELATED APPLICATION(S)

This application claims benefit of priority to Korean Patent Application No. 10-2022-0015555 filed on Feb. 7, 2022 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, may be a chip-type condenser mounted on the printed circuit boards of any of various electronic products, such as an imaging device, including a liquid crystal display (LCD) or a plasma display panel (PDP), a computer, a smartphone, or a mobile phone, serving to charge or discharge electricity therein or therefrom.

The multilayer ceramic capacitor has a small size, implements high capacitance, and is easily mounted on a circuit board, and may thus be used as a component of various electronic devices. There has been increasing demand for the multilayer ceramic capacitor to have a smaller size and higher capacitance as various types of electronic devices such as a computer and a mobile device have a smaller size and higher output.

In addition, in recent years, as industry interest in electronic products has increased, multilayer ceramic capacitors have been required to have high reliability characteristics to be used in automobiles and infotainment systems.

To achieve miniaturization and high capacitance of a multilayer ceramic capacitor, the number of laminated layers needs to be increased by forming internal electrodes and dielectric layers to be thin, and a volume of a portion which does not affect formation of capacitance needs to be significantly reduced to increase an effective volume fraction required to implement capacitance.

In addition, a mounting space needs to be significantly reduced to mount as many components as possible in a limited area of a board.

SUMMARY

An aspect of the present disclosure is to provide a multilayer electronic component having improved capacitance per unit volume.

An aspect of the present disclosure is to provide a multilayer electronic component capable of minimizing a mounting space.

An aspect of the present disclosure is to provide a multilayer electronic component having improved reliability.

However, the object of the present disclosure is not limited to the above, and will be more easily understood in a process of describing specific embodiments of the present disclosure.

According to an aspect of the present disclosure, a multilayer electronic component, may include: a body including a dielectric layer and first and second internal electrodes alternately disposed with the dielectric layer interposed therebetween, the body having first and second surfaces opposing each other in a first direction, third and fourth surfaces connected to the first and second surfaces and opposing each other in a second direction, and fifth and sixth surfaces connected to the first to fourth surfaces and opposing each other in a third direction, the first surface including first and second band electrodes disposed to be spaced apart from each other; a first external electrode disposed on the third surface and connected to the first internal electrode and the first band electrode; a second external electrode disposed on the fourth surface and connected to the second internal electrode and the second band electrode; a first plating layer disposed on the first external electrode and the first band electrode; and a second plating layer disposed on the second external electrode and the second band electrode.

According to an aspect of the present disclosure, a multilayer electronic component may include: a body including a dielectric layer and first and second internal electrodes alternately disposed with the dielectric layer interposed therebetween, the body having first and second surfaces opposing each other in a first direction, third and fourth surfaces connected to the first and second surfaces and opposing each other in a second direction, and fifth and sixth surfaces connected to the first to fourth surfaces and opposing each other in a third direction, the first surface including first and second band electrodes disposed to be spaced apart from each other; a first external electrode disposed on the third surface and connected to the first internal electrode and the first band electrode; a second external electrode disposed on the fourth surface and connected to the second internal electrode and the second band electrode; a first insulating layer disposed on the first external electrode; a second insulating layer disposed on the second external electrode; a first plating layer disposed on the first band electrode; and a second plating layer disposed on the second band electrode.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
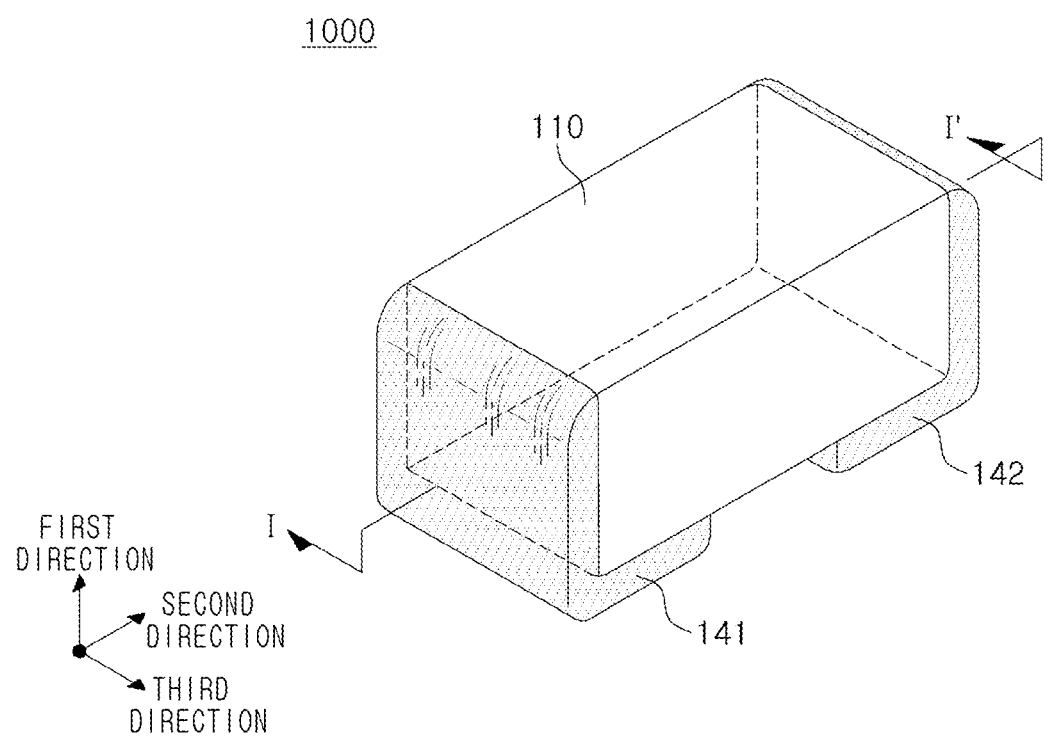
FIG. 1 is a schematic perspective view of a multilayer electronic component according to an embodiment of the present disclosure.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are the same elements in the drawings.

In the drawings, certain elements may be omitted to clearly illustrate the present disclosure, and to clearly express a plurality of layers and areas, thicknesses may be magnified. The same elements having the same function within the scope of the same concept will be described using the same reference numeral. Further, throughout the specification, it will be understood that when a portion "includes" an element, it can further include another element, not excluding another element, unless otherwise indicated.

In the drawings, a first direction may refer to a thickness (T) direction, a second direction may refer to a length (L) direction, and a third direction may refer to a width (W) direction.

FIG. 1 is a schematic perspective view of a multilayer electronic component according to an embodiment in the present disclosure.

Figure 2:
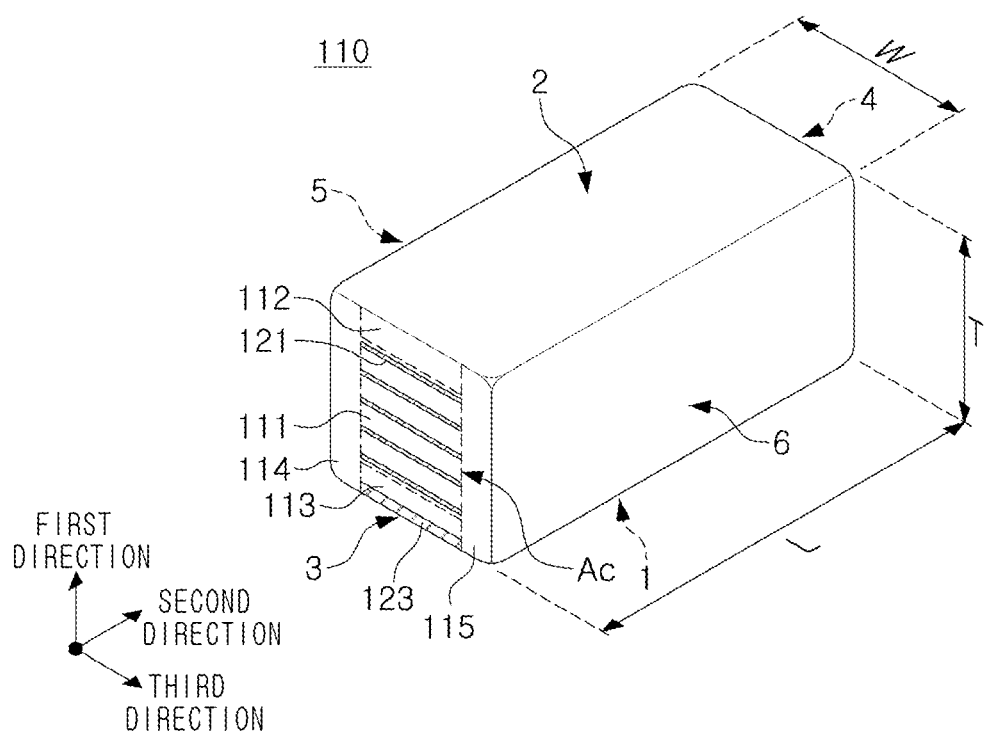
FIG. 2 is a schematic perspective view of a body of the multilayer electronic component of FIG. 1.

FIG. 2 is a schematic perspective view of a body of the multilayer electronic component of FIG. 1.

Figure 3:
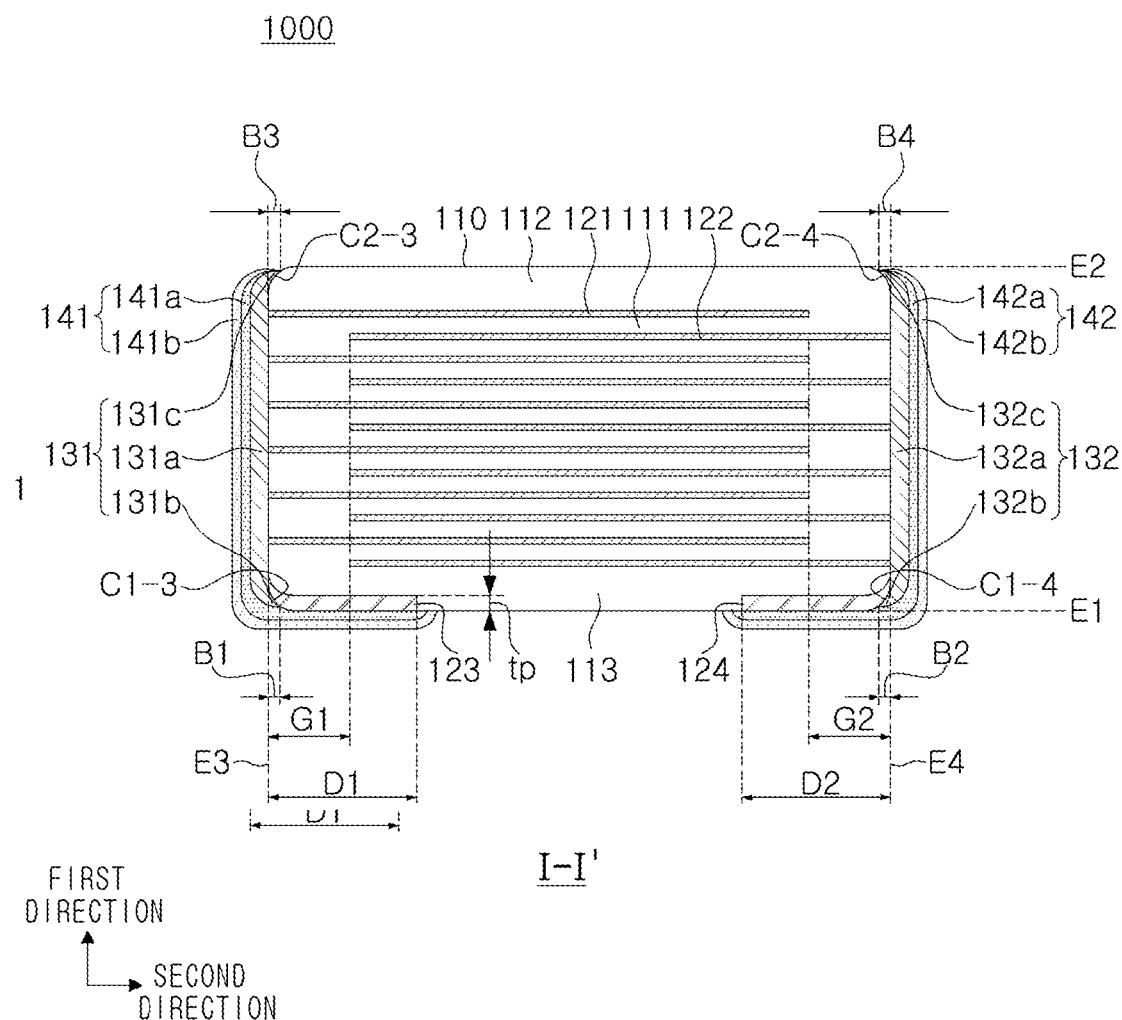
FIG. 3 is a cross-sectional view taken along line I-I' of FIG. 1.

FIG. 3 is a cross-sectional view taken along line I-I' of FIG. 1.

Figure 4:
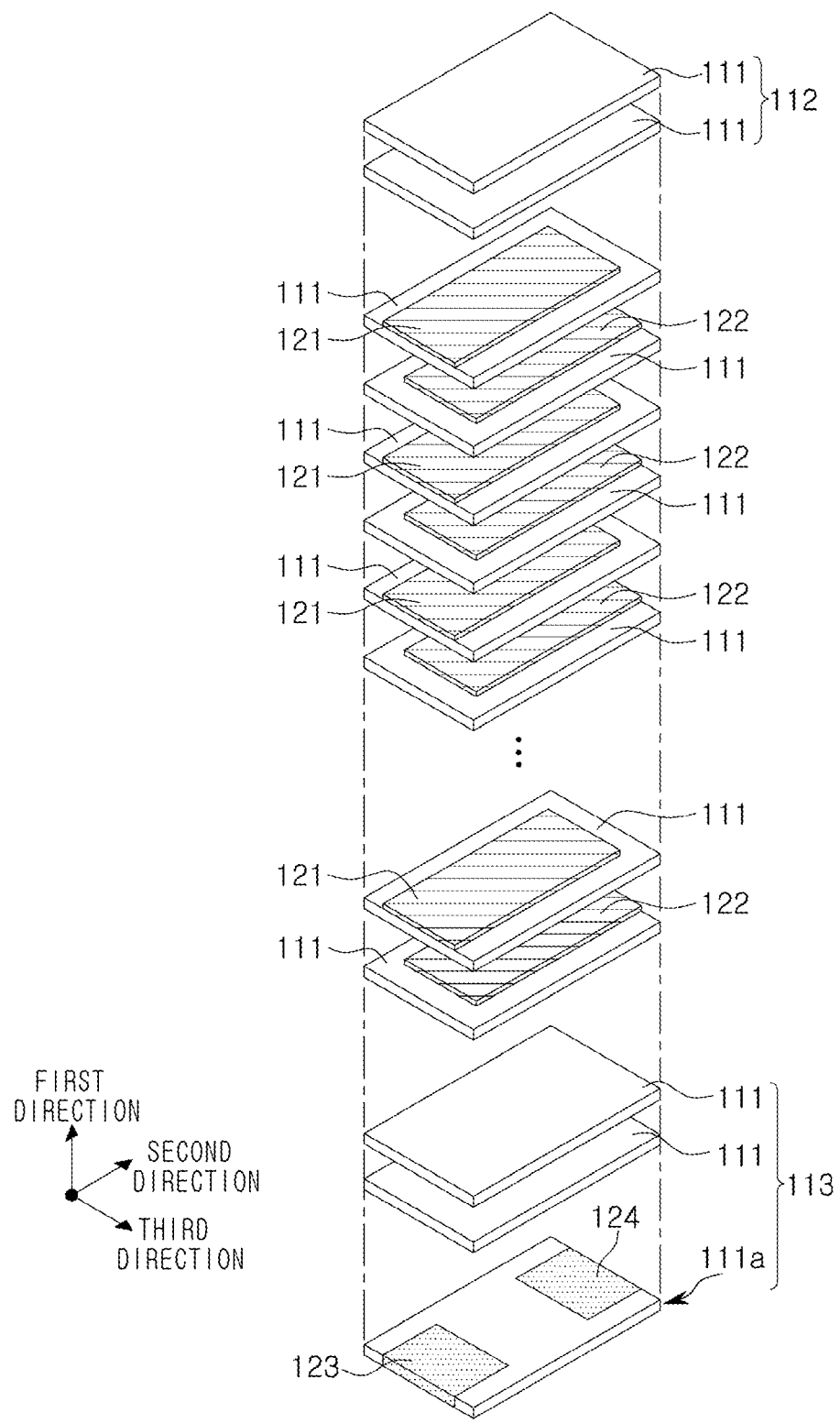
FIG. 4 is a schematic exploded perspective view of the body of FIG. 2.

FIG. 4 is a schematic exploded perspective view of the body of FIG. 2.

Figure 5:
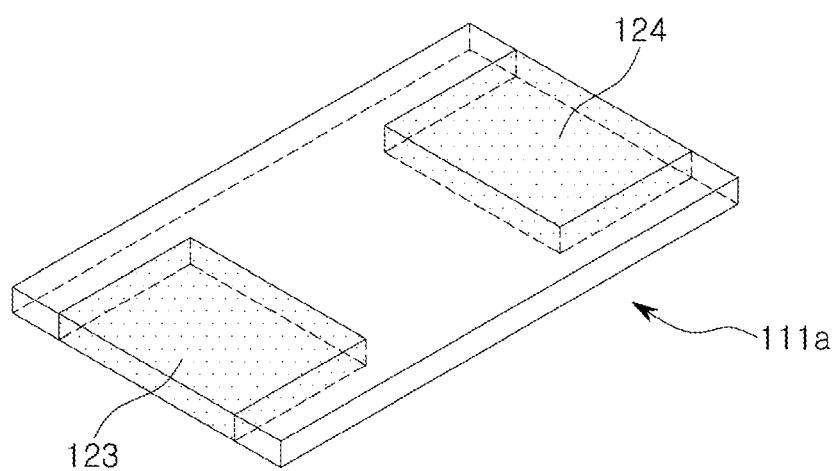
FIG. 5 illustrates a dielectric layer in which a band electrode is buried.

FIG. 5 illustrates a dielectric layer in which a band electrode is buried.

Figure 6:
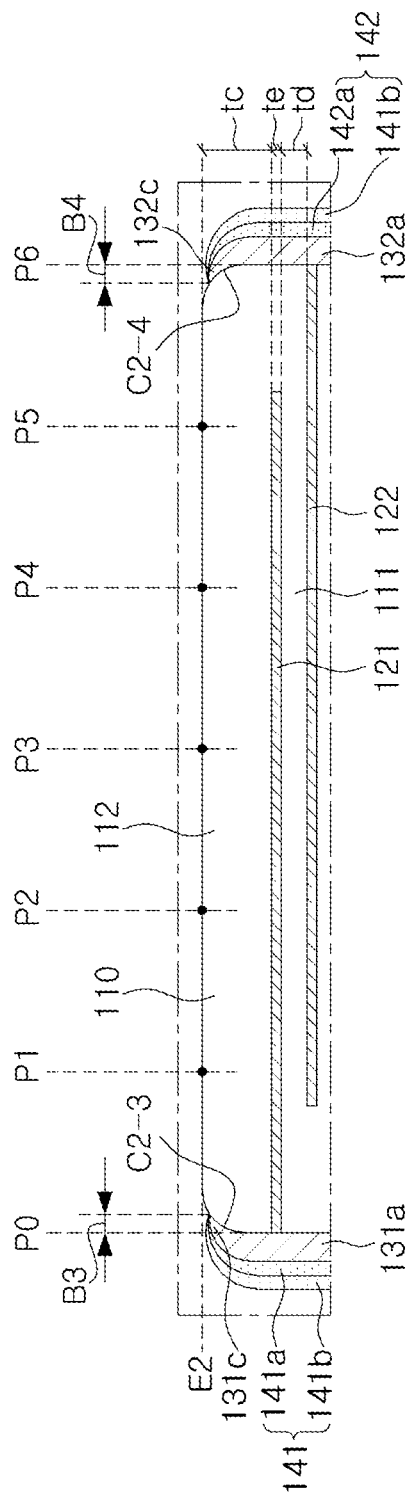
FIG. 6 is an enlarged view illustrating an enlarged upper portion of FIG. 3.

FIG. 6 is an enlarged view illustrating an enlarged upper portion of FIG. 3.

Figure 7:
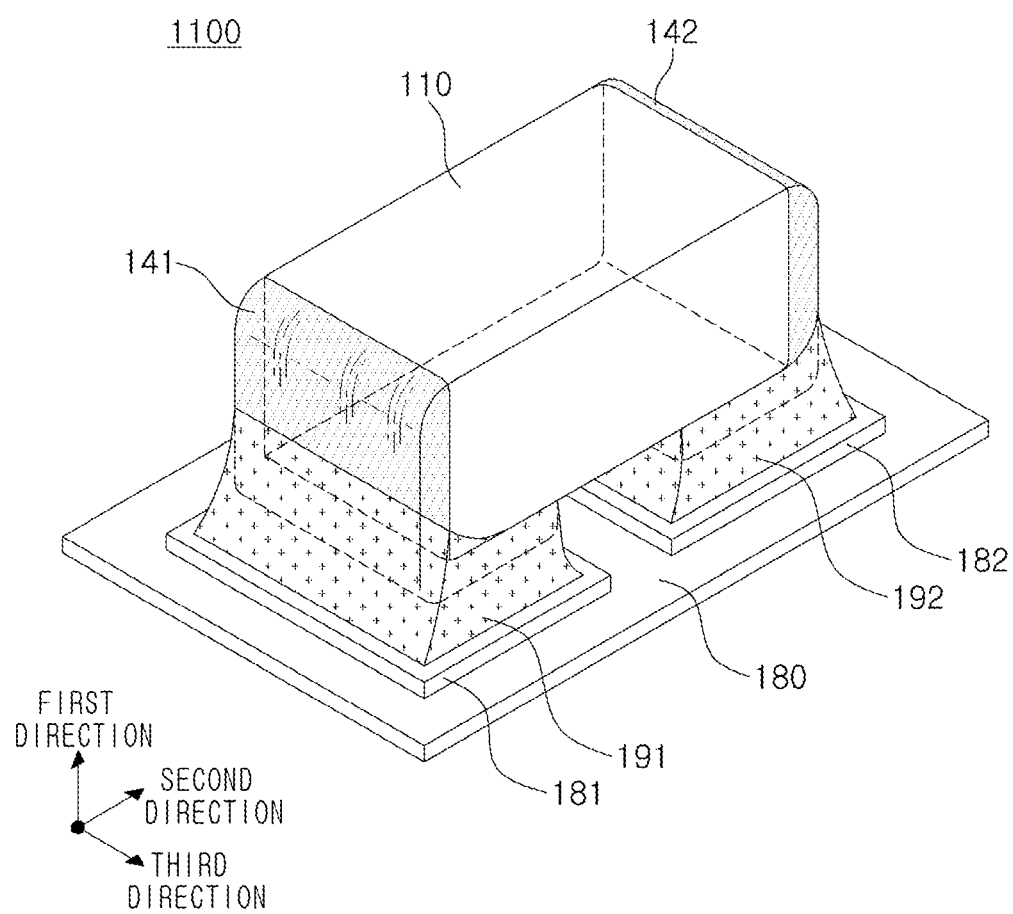
FIG. 7 is a schematic perspective view of a substrate on which the multilayer electronic component of FIG. 1 is mounted.

FIG. 7 is a schematic perspective view of a substrate on which the multilayer electronic component of FIG. 1 is mounted.

Hereinafter, a multilayer electronic component 1000 according to an embodiment of the present disclosure will be described with reference to FIGS. 1 to 7.

The multilayer electronic component 1000 according to an embodiment of the present disclosure may include: a body 110 including a dielectric layer 111 and first and second internal electrodes 121 and 122 alternately disposed with the dielectric layer 111 interposed therebetween, the body 110 having first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1 to 4 and opposing each other in a third direction, the first surface including first and second band electrodes 123 and 124 disposed to be spaced apart from each other; a first external electrode 131 disposed on the third surface 3 and connected to the first internal electrode 121 and the first band electrode 123; a second external electrode 132 disposed on the fourth surface 4 and connected to the second internal electrode 122 and the second band electrode 124; a first plating layer 141 disposed on the first band electrode 123; and a second plating layer 142 disposed on the second band electrode 124.

In the body 110, the dielectric layer 111 and the internal electrodes 121 and 122 may be alternately laminated.

The body 110 is not limited to a particular shape, and may have a hexahedral shape or a shape similar to the hexahedral shape, as illustrated in the drawings. The body 110 may not have the shape of a hexahedron having perfectly straight lines because ceramic powder particles included in the body 110 are contracted in a process in which the body is sintered. However, the body 110 may have a substantially hexahedral shape.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first and second surfaces 1 and 2, connected to the third and fourth surfaces 3 and 4, and opposing each other in a third direction.

In an embodiment, the body 110 may have a 1-3 corner C1-3 connecting the first and third surfaces 1 and 3, a 1-4 corner C1-4 connecting the first and fourth surfaces 1 and 4, a 2-3 corner C2-3 connecting the second and third surfaces 2 and 3, and a 2-4 corner C2-4 connecting the second and fourth surfaces 2 and 4, and the 1-3 corner C1-3 and the 2-3 corner C2-3 may have a shape contracted to a center of the body 110 in the first direction, toward the third surface 3, and the 1-4 corner C1-4 and the 2-4 corner C2-4 may have a shape contracted to a center of the body 110 in the first direction, toward the fourth surface 4.

As a margin portion, in which the internal electrodes 121 and 122 are not disposed, overlaps the dielectric layer 111, a step may be formed by thicknesses of the internal electrodes 121 and 122, so that a corner connecting the first surface 1 to the third to fifth surfaces 3 to 5 and/or a corner connecting the second surface 2 to the third to fifth surfaces 3 to 5 may have a shape contracted to a center of the body 110 in the first direction when viewed with respect to the first surface 1 or the second surface 2. Alternatively, by contraction behavior during a sintering process of the body 110, a corner connecting the first surface 1 to the third to sixth surfaces 3 to 6 and/or a corner connecting the second surface 2 to the third to sixth surfaces 3 to 6 may have a shape contracted to a center of the body 110 in the first direction when viewed with respect to the first surface 1 or the second surface 2. Alternatively, as a corner connecting respective surfaces of the body 110 to each other is rounded by performing an additional process to prevent chipping defects, or the like, a corner connecting the first surface 1 to the third to sixth surfaces 3 to 6 and/or a corner connecting the second surface 2 to the third to sixth surfaces 3 to 6 may have a rounded shape.

The corner may include a 1-3 corner connecting the first surface 1 and the third surface 3, a 1-4 corner connecting the first surface 1 and the fourth surface 4, a 2-3 corner connecting the second surface 2 and the third surface 3, and a 2-4 corner connecting the second surface 2 and the fourth surface 4. In addition, the corner may include a 1-5 corner connecting the first surface 1 and the fifth surface 5, a 1-6 corner connecting the first surface 1 and the sixth surface 6, a 2-5 corner connecting the second surface 2 and the fifth surface 5, and a 2-6 corner connecting the second surface 2 and the sixth surface 6. The first to sixth surfaces 1, 2, 3, 4, 5, and 6 of the body 110 may be overall planar surfaces, and non-planar regions may be corners. Hereinafter, an extension line of each surface may refer to a line extending based on a planar portion of each surface.

In this case, a region of the external electrodes 131 and 132, disposed on a corner of the body 110 may be referred to as a corner portion, a region disposed on the third and fourth surfaces 3 and 4 of the body 110 may be referred to as a connection portion, and a region disposed on the first and second surfaces 1 and 2 of the body 110 may be referred to as a band portion.

Meanwhile, in order to suppress the step portion caused by the internal electrodes 121 and 122, after the internal electrodes are cut so as to be exposed to the fifth and sixth surfaces 5 and 6 of the body after lamination, when margin portions 114 and 115 are formed by laminating a single dielectric layer or two or more dielectric layers on both side surfaces of the capacitance formation portion Ac in a third direction (width direction), a portion connecting the first surface to the fifth and sixth 5 and 6 surfaces and a portion connecting the second surface 2 to the fifth and sixth surfaces 5 and 6 may not have a contracted form.

Meanwhile, the first to sixth surfaces of the body 110 may generally be flat surfaces overall, and non-flat regions may be considered to be corners.

In this regard, the third and fourth corner portions 131c and 132c may be disposed on a level same as or lower than a level of an extension line E2 of the second surface 2, and the third and fourth corner portions 131c and 132c may be disposed to be spaced apart from the second surface 2. That is, as the external electrodes 131 and 132 are not disposed on the second surface 2, a volume occupied by the external electrodes 131 and 132 may be further significantly reduced to further increase capacitance per unit volume of the multilayer electronic component 1000. In addition, the third corner portion 131c may be disposed on a portion of the 2-3 corner C2-3 connecting the third surface 3 and the second surface 2 to each other, and the fourth corner portion 132c may be disposed on a portion of the 2-4 corner C2-4 connecting the fourth surface 4 and the second surface 2 to each other.

The extension line E2 of the second surface may be defined as follows. In cross-sections of the multilayer electronic component 1000 taken in length-thickness directions from a center thereof in a width direction (L-T cross-sections), seven straight lines P0, P1, P2, P3, P4, P5, P6, and P7 having a uniform thickness from the third surface 3 to the fourth surface 4 in a length direction may be drawn, and a straight line passing through a point, at which the straight line P2 and the second surface 2 meet, and a point, at which the straight line P4 and the second surface 2 meet, may be defined as the extension line E2 of the second surface 2.

In an embodiment, the first surface 1 may include first and second band electrodes 123 and 124 disposed to be spaced apart from each other.

In order to improve the capacitance per unit volume of multilayer electronic components and to minimize the mounting space, MLCCs in which external electrodes are disposed only on the mounting surface or in which external electrodes are disposed in an L-shape are being developed. By not disposing an external electrode in a portion determined to be unnecessary for implementing capacitance and characteristics, an additional effective volume may be secured.

Conventionally, a band electrode disposed on a mounting surface was largely formed in two methods. In a first method, to form a band electrode on a body after sintering has been completed, and a separate electrode sintering process is required. In a second method, a band electrode is printed on a body before sintering, or a band electrode is printed on a ceramic green sheet, so that the band electrode was also heat treated at the same time when the body is sintered. In both methods, it was difficult to maximize the capacitance per unit volume due to an increase in the volume by the band electrode, since a band electrode was formed in the state in which a skeleton of the body was prepared.

Accordingly, in the present disclosure, since the band electrodes 123 and 124 are included on the first surface 1 of the body 110, the capacitance per unit volume may be maximized by suppressing an increase in volume due to the band electrode.

A method of forming the band electrodes 123 and 124 does not need to be particularly limited. For example, the band electrodes 123 and 124 may be formed by removing a portion in which the band electrode is to be formed on the ceramic green sheet, printing a paste for forming band electrodes on the removed portion, and then placing the same below a laminate and sintering together with the body.

In an embodiment, the first band electrode 123 may be connected to the third surface 3 of the body 110, and the second band electrode 124 may be connected to the fourth surface 4 of the body 110. Accordingly, connectivity thereof with the external electrodes 131 and 132 may be improved. In addition, the first band electrode 123 may also be disposed in the 1-3 corner C1-3, and the second band electrode 124 may also be disposed in the 1-4 corner C1-4. The first and second band electrodes 123 and 124 may be disposed to be spaced apart from the fifth and sixth surfaces.

In addition, an average size of the first and second band electrodes 123 and 124 in the third direction is not particularly limited. For example, the average size of the first and second band electrodes 123 and 124 in the third direction may be substantially the same as the average size of the first and second internal electrodes 121 and 122 in the third direction, as illustrated in FIGS. 2, 4 and 5. However, the present disclosure is not limited thereto, the average size of the first and second band electrodes 123 and 124 may be determined in consideration of the average size of the body 110 in the third direction, the average size of the external electrodes 131 and 132 in the third direction, and the connectivity thereof with the external electrodes 131 and 132.

In an embodiment, the first and second band electrodes 123 and 124 may be buried in the first surface. Referring to FIG. 5, as a dielectric layer 111a including the band electrodes 123 and 124 forms a first surface, the first and second band electrodes 123 and 124 may be buried in the first surface.

In addition, the first and second band electrodes 123 and 124 may be substantially coplanar with the first surface. That is, the first and second band electrodes 123 and 124 may be exposed to the first surface of the body 110, and may be buried in the body.

In an embodiment, the band electrodes 123 and 124 may have an average thickness "tp" of 0.1 μm or less. A depth at which the band electrodes 123 and 124 are buried in the body may be considered to be a thickness of the band electrode, and the average thickness "tp" of the band electrodes 123 and 124 may mean an average size in the first direction.

When the average thickness "tp" of the band electrodes 123 and 124 is less than 0.1 μm, electrical connectivity thereof with the external electrodes 131 and 132 may not be sufficiently secured, or electrical connectivity thereof with the plating layer may be insufficient. An upper limit of the average thickness "tp" of the band electrodes 123 and 124 does not need to be particularly limited, and the upper limit thereof may be determined in consideration of a short with the internal electrodes 121 and 122 disposed in an outermost layer.

The average thickness "tp" of the band electrodes 123 and 124 may be measured from an image obtained by scanning a cross-section of the body 110 in the length and thickness directions (L-T) with a scanning electron microscope (SEM) of 10,000 magnifications, and may be a value obtained by averaging sizes of the band electrodes 123 and 124 in the first direction measured at five points at equal intervals on the first surface.

In an embodiment, the first and second band electrodes 123 and 124 may include at least one of Ni, Cr, Pd, and Pt. Accordingly, it is possible to prevent excessive shrinkage and oxidation during sintering together with the body.

In an embodiment, the first and second band electrodes 123 and 124 may include at least one ceramic additive of $BaTiO_3$, $TiO_2$ and $SiO_2$. Accordingly, aggregation and breakage of the band electrodes 123 and 124 may be suppressed by improving the bonding strength to the dielectric layer and reducing a difference in a sintering behavior with the dielectric layer.

In an embodiment, when an average size from an extension line E3 of a third surface 3 to an end of the first band electrode 123 in the second direction is D1, an average size from an extension line E4 of a fourth surface 4 to an end of the second band electrode 124 in the second direction is D2, an average size of a region, in which the third surface 3 and the second internal electrode 122 are spaced apart from each other, in the second direction is G1, and an average size of a region, in which the fourth surface 4 and the first internal electrode 122 are spaced apart from each other in the second direction is G2, D1≥G1 and D2≥G2 may be satisfied. Accordingly, adhesion strength thereof with a substrate can be improved.

D1 and D2 may be values obtained by averaging values measured in a cross-section (L-T cross-section) obtained by cutting the body 110 in the first and second directions at five points at equal intervals in the third direction.

For G1 and G2, G1 may be a value obtained by averaging sizes spaced apart from the third surface 3 in the second direction and measured with respect to five arbitrary second internal electrodes 122 disposed in a central portion in the first direction, and G2 may be a value obtained by averaging sizes of regions, spaced apart from the fourth surface 4 measured with respect to five arbitrary first internal electrodes 121 disposed in the central portion in the first direction, in the second direction, in a cross-section of the body in the third direction taken from a center thereof in the first and second directions.

Furthermore, G1 and G2 may be obtained at five points at equal intervals, in the third direction, in a cross-section of the body 110 taken in first and second directions (an L-T cross-section), and an average value of the average sizes "G1" and "G2" may be further generalized.

In an embodiment, when an average size of the body 110 in a second direction is L, an average size from an extension line E3 of a third surface 3 to an end of the first band electrode 123 in the second direction is D1, and an average size from an extension line E4 of a fourth surface 4 to an end of the second band electrode 124 in the second direction is D2, $0.2 \leq D1/L \leq 0.4$ and $0.2 \leq D2/L \leq 0.4$ may be satisfied.

When D1/L and D2/L are less than 0.2, it may be difficult to secure sufficient adhesion strength. On the other hand, when D2/L exceeds 0.4, there is a concern that a leakage current may be generated between the first band electrode 123 and there is a concern that the first band electrode 123 and the second band electrode 124 are electrically connected to each other due to plating spreading, or the like, during a plating process.

D1 and D2 may be values obtained by averaging values measured in a cross-section (L-T cross-section) obtained by cutting the body 110 in the first and second directions at five points at equal intervals in the third direction.

A plurality of dielectric layers 111 forming the body 110 may be in a sintered state, and adjacent dielectric layers 111 may be integrated with each other, such that boundaries therebetween may not be readily apparent without the use of a scanning electron microscope (SEM).

According to an embodiment in the present disclosure, a raw material of the dielectric layer 111 is not particularly limited as long as sufficient capacitance may be obtained. For example, a barium titanate-based material, a lead composite perovskite-based material, a strontium titanate-based material, or the like, may be used as the raw material of the dielectric layer 111. The barium titanate-based material may include $BaTiO_3$-based ceramic powder particles. Examples of the $BaTiO_3$-based ceramic powder particles may include $BaTiO_3$ and $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1$ and $0<y<1)$, $Ba(Ti_{1-y}Zr_y)O_3$ $(0<y<1)$, or the like, in which calcium (Ca), zirconium (Zr), or the like, is partially solid-dissolved in $BaTiO_3$.

In addition, a raw material of the dielectric layer 111 may include various ceramic additives, organic solvents, binders, dispersants, and the like, added to powder particles such as barium titanate ($BaTiO_3$) powder particles, or the like, according to an object of the present disclosure.

Meanwhile, an average thickness "td" of the dielectric layer 111 does not need to be particularly limited.

However, the average thickness "td" of the dielectric layer 111 may be 0.35 μm or less to more easily achieve the miniaturization and the high capacitance of the multilayer electronic component.

In addition, according to an embodiment, by disposing an insulating layer on an external electrode, permeation of external moisture and permeation of a plating solution may be prevented to improve reliability. Therefore, excellent reliability may be ensured even when the average thickness "tc" of the dielectric layer 111 is 15 μm or less. A reliability improvement effect of the multilayer electronic component according to the present disclosure may become more remarkable.

The average thickness "td" of the dielectric layer 111 may refer to an average thickness of the dielectric layer 111 disposed between the first and second internal electrodes 121 and 122.

The average thickness of the dielectric layer 111 may be measured from an image obtained by scanning a cross section of the body 110 in the length and thickness directions (L-T) with a scanning electron microscope (SEM) of 10,000 magnifications. More specifically, an average value may be measured by measuring thicknesses of one dielectric layer at 30 points positioned at equal intervals in the length direction in the obtained image. The 30 points positioned at equal intervals may be designated in the capacitance formation portion Ac. In addition, when an average thickness of ten dielectric layers is measured, the average thickness of the dielectric layers may further be generalized.

The body 110 may include a capacitance formation portion Ac, disposed in the body 110 and including a first internal electrode 121 and a second internal electrode 122 disposed to face each other with the dielectric layer 111 interposed therebetween to form capacitance, and cover portions 112 and 113, disposed above and below the capacitance formation portion Ac in the first direction.

In addition, the capacitance formation portion Ac, which contributes to formation of capacitance of a capacitor, may be formed by repeatedly laminating a plurality of first and second internal electrodes 121 and 122 with the dielectric layer 111 interposed therebetween.

The cover portions 112 and 113 may include an upper cover portion 112, disposed above the capacitance formation portion Ac in the first direction, and a lower cover portion 113 disposed below the capacitance formation portion Ac in the first direction. The lower cover portion 113 may include first and second band electrodes 123 and 124. The upper cover portion 112 may include third and fourth band electrodes 125 and 126.

Referring to FIG. 4, the upper cover portion 112 and the lower cover portion 113 may be formed by laminating a single dielectric layer or two or more dielectric layers on upper and lower surfaces of the capacitance formation portion Ac, respectively, in the thickness direction, and may be formed by laminating one or more dielectric layers 111a including the band electrodes 123 and 124 on an outermost layer thereof. The cover portions 112 and 113 may basically serve to prevent damage to the internal electrodes caused by physical or chemical stress.

The upper cover portion 112 and the lower cover portion 113 may include the band electrodes 123 and 124, but may not include the internal electrodes, and may include the same material as the dielectric layer 111. That is, the upper cover portion 112 and the lower cover portion 113 may include a ceramic material such as a barium titanate (BaTiO$_3$)-based ceramic material.

Meanwhile, an average thickness of the cover portions 112 and 113 does not need to be particularly limited. However, an average thickness "tc" of the cover portion 112 or 113 may be 15 μm or less to more easily achieve the miniaturization and the high capacitance of the multilayer electronic component. In addition, according to an embodiment, when an insulating layer is disposed on an external electrode according to an embodiment of the present disclosure, permeation of external moisture and permeation of a plating solution may be prevented to improve reliability. Therefore, improved reliability may be ensured even when the average thickness "tc" of the cover portions 112 or 113 is 15 μm or less.

The average thickness "tc" of the cover portion 112 or 113 may refer to an average size in the first direction, and may be a value obtained by averaging sizes, in the first direction, of the cover portions 112 and 113 measured at five points disposed at equal intervals above or below the capacitance formation portion Ac.

In addition, margin portions 114 and 115 may be disposed on a side surface of the capacitance formation portion Ac.

The margin portions 114 and 115 may include a margin portion 114, disposed on the fifth surface 5 of the body 110, and a margin portion 115, disposed on the sixth surface 6 of the body 110. That is, the margin portions 114 and 115 may be disposed on both end surfaces of the body 110 in the width direction.

The margin portions 114 and 115 may refer to regions at an interface between both ends of the first and second internal electrodes 121 and 122 and the body 110 in a cross-section of the body 110 taken in the width-thickness (W-T) directions, as illustrated in FIG. 3.

The margin portions 114 and 115 may basically serve to prevent damage to the internal electrodes caused by physical or chemical stress.

The margin portions 114 and 115 may be formed by applying a conductive paste to ceramic green sheets, except for places in which the margin portions are to be formed to form the internal electrodes.

In addition, to suppress a step formed by the internal electrodes 121 and 122, the margin portions 114 and 115 may be formed by laminating ceramic green sheets, cutting the laminated ceramic green sheets to expose the internal electrodes to the fifth and sixth surfaces 5 and 6 of the body 110, and then laminating a single dielectric layer or two or more dielectric layers on both side surfaces of the capacitance formation portion Ac in the third direction (the width direction).

Meanwhile, an average width of the margin portions 114 and 115 do not need to be particularly limited. However, the average width of the margin portions 114 or 115 may be 15 μm or less to more easily achieve miniaturization and high capacitance of the multilayer electronic component. In addition, according to an embodiment, by disposing an insulating layer on an external electrode, permeation of external moisture and permeation of a plating solution may be prevented to improve reliability. Therefore, improved reliability may be ensured even when the average width of the margin portion 114 or 115 is 0.35 μm or less.

The average width of the cover portion 112 or 113 may refer to an average value of sizes, in the third direction, of the margin portion 112 or 113 measured at five points disposed at equal intervals on a side surface of the capacitance formation portion Ac.

The internal electrodes 121 and 122 may be laminated alternately with the dielectric layer 111.

The internal electrodes 121 and 122 may include first and second internal electrodes 121 and 122. The first and second internal electrodes 121 and 122 may be alternately disposed to face each other with the dielectric layer 111, constituting the body 110, interposed therebetween, and may be exposed to the third and fourth surfaces 3 and 4 of the body 110, respectively.

Referring to FIG. 3, the first internal electrode 121 may be spaced apart from the fourth surface 4 and may be exposed through the third surface 3, and the second internal electrode 122 may be spaced apart from the third surface 3 and may be exposed through the fourth surface 4. A first external electrode 131 may be disposed on the third surface 3 of the body to be connected to the first internal electrode 121, and a second external electrode 132 may be disposed on the fourth surface 4 of the body to be connected to the second internal electrode 122.

That is, the first internal electrode 121 may not be connected to the second external electrode 132 and may be connected to the first external electrode 131, and the second internal electrode 122 may not be connected to the first external electrode 131 and may be connected to the second external electrode 132. Accordingly, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically separated from each other by the dielectric layer 111 disposed therebetween.

The body 110 may be formed by alternately laminating a ceramic green sheet, on which the first internal electrode 121 is printed, and a ceramic green sheet, on which the second internal electrode 122 is printed, and sintering the laminated ceramic green sheets.

A material of the internal electrodes 121 and 122 is not limited, and may be a material having excellent electrical conductivity. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for internal electrodes including at least one of nickel (Ni), copper (Cu), palladium (Pd), silver (Ag), gold (Au), platinum (Pt), tin (Sn), tungsten (W), titanium (Ti), and alloys thereof on ceramic green sheets. A method of printing the conductive paste for internal electrodes may be a screen printing method, a gravure printing method, or the like, but embodiments of the present disclosure are not limited thereto.

Meanwhile, an average thickness "te" of the internal electrodes 121 and 122 does not need to be particularly limited.

The average thickness "te" of the internal electrodes 121 and 122 may be 0.35 μm or less to more easily achieve the miniaturization and the high capacitance of the multilayer electronic component.

In addition, by disposing an insulating layer on an external electrode according to an embodiment of the present disclosure, permeation of external moisture and permeation of a plating solution may be prevented to improve reliability. Therefore, improved reliability may be ensured even when the average thickness of the internal electrodes 121 and 122 is 0.35 μm or less. The miniaturization and the high capacitance of the multilayer electronic component may be more easily achieved.

The average thickness of the internal electrode 121 and 122 may be measured from an image obtained by scanning a cross-section of the body 110 in the length and thickness directions (L-T) with a scanning electron microscope (SEM) of 10,000 magnifications. More specifically, an average value may be measured by measuring thicknesses of one internal electrode at 30 points positioned at equal intervals in the length direction in the scanned image. The points positioned at equal intervals may be designated in the capacitance formation portion Ac. In addition, when an average thickness of ten internal electrodes is measured, the average thickness of the internal electrodes may further be generalized.

External electrodes 131 and 132 may be disposed on the third surface 3 and the fourth surface 4 of the body 110. The external electrode 131 and 132 may include first and second external electrodes 131 and 132 respectively disposed on the third and fourth surfaces 3 and 4 of the body 110, to be respectively connected to the first and second internal electrodes 121 and 122. In addition, the first and second external electrodes 131 and 132 may be respectively connected to first and second band electrodes 123 and 124.

In an embodiment, the first and second external electrodes 131 and 132 may be disposed to be spaced apart from the first and second surfaces 1 and 2. In an embodiment, the first and second external electrodes 131 and 132 may be disposed to be spaced apart from the fifth and sixth surfaces and 6. In addition, the first and second external electrodes 131 and 132 may be disposed to be spaced apart from the first, second, fifth, and sixth surfaces 1, 2, 5, and 6. That is, the first and second external electrodes 131 and 132 may not be disposed on the first, second, fifth, and sixth surfaces 1, 2, 5, and 6. Accordingly, the capacitance per unit volume of the multilayer electronic component 1000 can be increased by minimizing a volume occupied by the external electrodes 131 and 132.

The external electrodes 131 and 132 may include a corner extending to a corner of the body 110 and disposed on the corner. That is, in an embodiment, the first external electrode 131 may include a first connection portion 131a disposed on the third surface 3, a first corner portion 131b disposed to extend from the first connection portion 131a to a corner connecting the first and third surfaces 1 and 3, and a third corner portion 131c disposed to extend from the first connection portion 131a to a corner connecting the second and third surfaces 2 and 3. The second external electrode 132 may include a second connection portion 132a disposed on the fourth surface 4, a second corner portion 132b disposed to extend from the second connection portion 132a to a corner connecting the first and fourth surfaces 1 and 4, and a fourth corner portion 132c disposed to extend from the second connection portion 132a to a corner connecting the second and fourth surfaces 2 and 4. Accordingly, the capacity per unit volume may be maximized while improving connectivity between the external electrode and the band electrode. The first and second corner portions 131b and 132b may be disposed so as not to meet the extension line E1 of the first surface, The third and fourth corner portions 131c and 132c may be disposed below the extension line E2 of the second surface. That is, the first and second corner portions 131b and 132b may not be disposed on the first surface, and the third and fourth corner portions 131c and 132c may not be disposed on the second surface.

In this case, when an average size from an extension line E3 of a third surface 3 to an end of the first corner portion 131b in the second direction is B1, an average size from an extension line E4 of the fourth surface 4 to an end of the second corner portion 132b in the second direction is B2, an average size from the extension line E3 of the third surface 3 to an end of the third corner portion 131c in the second direction is B3, an average size from the extension line E4 of the fourth surface 4 to an end of the fourth corner portion 132c in the second direction is B4, an average size of a region, in which the third surface 3 and the second internal electrode 122 are spaced apart from each other, in the second direction is G1, and an average size of a region, in which the fourth surface 4 and the first internal electrode 121 are spaced apart from each other, in the second direction is G2, B1≤G1, B3≤G1, B2≤G2 and B4≤G2 may be satisfied. Accordingly, the capacitance per unit volume of the multilayer electronic component 1000 may be increased by minimizing the volume occupied by the external electrodes 131 and 132.

The average sizes "B1," "B2," "B3," and "B4" may be values obtained by averaging values measured at five points at equal intervals, in the third direction, in a cross-section of the body 110 taken in the first and second directions (an L-T cross-section).

The average sizes "G1" and "G2" may be values obtained by averaging values measured at five points at equal intervals, in the third direction, in a cross-section of the body 110 taken in the first and second directions (an L-T cross-section). The average size "G1" may be a value obtained by averaging sizes spaced apart from the third surface 3 in the second direction and measured with respect to five arbitrary second internal electrodes 122 disposed in a central portion in the first direction, and the average size "G2" may be a value obtained by averaging sizes of regions, spaced apart from the fourth surface 4 measured with respect to five arbitrary first internal electrodes 122 disposed in the central portion in the first direction, in the second direction.

Furthermore, G1 and G2 may be obtained at five points at equal intervals, in the third direction, in a cross-section of the body 110 taken in first and second directions (an L-T cross-section), and an average value of the average sizes "G1" and "G2" may be further generalized.

However, the present disclosure is not limited thereto, and as will be described later, the external electrodes 131 and 132 may include a band portion extending onto portions of the first surface and the second surface. Furthermore, the first external electrode 131 may include a side band portion extending from the first connection portion 131a to portions of the fifth and sixth surfaces, and the second external electrode 132 may include a side band portion extending from the second connection portion 132a to portions of the fifth and sixth surfaces.

A structure, in which the multilayer electronic component 1000 has two external electrodes 131 and 132, has been described in the present embodiment. However, the number and shape of the external electrodes 131 and 132 may vary depending on the shape of the internal electrodes 121 and 122 or other objects.

Meanwhile, the external electrodes 131 and 132 may be formed of any material having electrical conductivity, such as a metal, and a specific material of each of the external electrodes 131 and 132 may be determined in consideration of electrical characteristics, structural stability, and the like. Furthermore, the external electrodes 131 and 132 may have a multilayer structure.

The electrode layers 131 and 132 may be sintered electrodes including a conductive metal and glass or resin-based electrodes including a conductive metal or a resin.

In addition, the external electrodes 131 and 132 may have a form in which a sintered electrode and a resin-based electrode are sequentially formed. In addition, the external electrodes 131 and 132 may be formed by transferring a sheet including a conductive metal onto the body, or may be formed by transferring a conductive metal onto the sintered electrode.

As the conductive metal included in the external electrodes 131 and 132, a material having excellent electrical conductivity may be used, but is not particularly limited. For example, the conductive metal may be at least one of Cu, Ni, Pd, Ag, Sn, Cr, and alloys thereof. Preferably, the electrode layers 131 and 132 may include at least one of Ni and a Ni alloy, and accordingly, connectivity with the internal electrodes 121 and 122 including Ni can be further improved.

In addition, the external electrodes 131 and 132 may include Cu, and accordingly, the adhesion thereof between the band electrodes 123 and 124 may be improved, and electrical connectivity thereof with the internal electrodes 121 and 122 may be further improved.

The first and second plating layers 141 and 142 may be disposed on the first and second band portions 123 and 124, respectively. The plating layers 141 and 142 may be disposed to be in direct contact with the first and second band electrodes 123 and 124, respectively. The plating layers 141 and 142 may serve to improve the mounting characteristics.

In addition, the first plating layer 141 may be disposed on the first band electrode 123 and the first external electrode 131, and the second plating layer 142 may be disposed on the second band electrode 124 and the second external electrode 132. In addition, the first plating layer 141 may be disposed to cover the first band electrode 123 and the first external electrode 131, and the second plating layer 142 may be disposed to cover the second band electrode 124 and the second external electrode 132.

The type of the plating layers 141 and 142 is not particularly limited. Each of the plating layers 141 and 142 may be a plating layer including at least one of Cu, Ni, Sn, Ag, Au, Pd, and alloys thereof, and may be formed as a plurality of layers.

As a more specific example of the plating layers 141 and 142, the plating layers 141 and 142 may have a form, in which Ni plating layers 141a and 142a and Sn plating layers 141b and 142b are sequentially disposed.

Referring to FIG. 7 illustrating a mounting substrate on which the multilayer electronic component 1000 is mounted, the plating layers 141 and 142 of the multilayer electronic component 1000 may be bonded by electrode pads 181 and 182 and solders 171 and 172 disposed on the substrate 180.

Meanwhile, when the internal electrodes 121 and 122 are laminated in the first direction, the multilayer electronic component 1000 may be horizontally mounted on the substrate 180 such that the internal electrodes 121 and 122 are parallel to a mounting surface. However, embodiments of the present disclosure are not limited to the case of horizontal mounting. When the internal electrodes 121 and 122 are laminated in the third direction, the multilayer electronic component 1000 may be vertically mounted on the substrate 180 such that the internal electrodes 121 and 122 are perpendicular to the mounting surface.

A size of the multilayer electronic component 1000 does not need to be particularly limited.

However, to achieve both miniaturization and high capacitance, the number of laminated layers should be increased by thinning a dielectric layer and internal electrodes. An effect of improving reliability and capacitance per unit volume according to the present disclosure may become more remarkable in the multilayer electronic component 1000 having a size of 1005 (length×width, 1.0 mm×0.5 mm) or less.

Accordingly, when the multilayer electronic component 1000 has a length of 1.1 mm or less and a width of 0.55 mm or less in consideration of a manufacturing error and a size of an external electrode, a reliability improvement effect according to the present disclosure may be more remarkable. The length of the multilayer electronic component 1000 may refer to a size of the multilayer electronic component 1000 in the second direction, and the width of the multilayer electronic component 1000 may refer to a size of the multilayer electronic component 1000 in the third direction.

Figure 8:
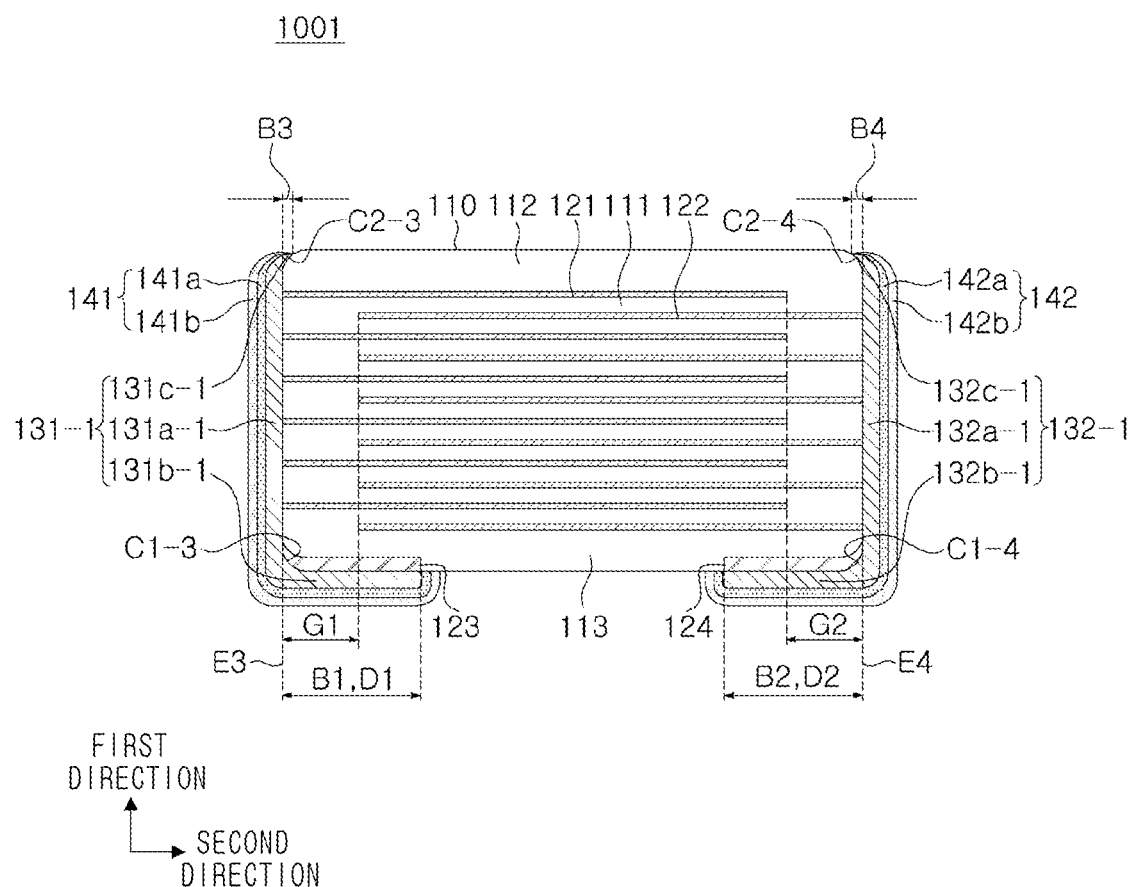
FIG. 8 illustrates a modified example of FIG. 3.

FIG. 8 illustrates a modified example of FIG. 3.

Referring to FIG. 8, the multilayer electronic component 1001 may include a first external electrode 131-1 including a first band portion 131b-1 and a second external electrode 132-1 including a second band portion 132b-1.

The first external electrode 131-1 may include a first connection portion 131a-1 disposed on a third surface 3, a first band portion 131b-1 disposed to extend from the first connection portion 131a-1 onto a portion of the first surface 1, and a third edge portion 131c-1 disposed to extend from the first connection portion 131a-1 onto a corner connecting the second and third surfaces 2 and 3, and the second external electrode 132-1 may include a second connection portion 132a-1, a second band portion 132b-1 disposed to extend from the second connection portion 132a-1 onto a portion of the first surface 1, and a fourth corner portion 132c-1 disposed to extend from the second connection portion 132a-1 onto a corner connecting the second and fourth surfaces 2 and 4.

In an embodiment, when an average size from an extension line E3 of a third surface 3 to an end of the first band portion 131b-1 in the second direction is B1, an average size from an extension line E4 of a fourth surface 4 to an end of the second band portion 132b-1 in the second direction is B2, an average size from the extension line E3 of the third surface 3 to an end of the third corner portion 131c-1 in the second direction is B3, an average size from the extension line E4 of the fourth surface 4 to an end of the fourth corner portion 132c-1 in the second direction is B4, an average size of a region, in which the third surface 3 and the second internal electrode 122 are spaced apart from each other in the second direction is G1, and an average size of a region, in which the fourth surface 4 and the first internal electrode 121 are spaced apart from each other in the second direction is G2, B1≥G1, B3≤G1, B2≥G2 and B4≤G2 may be satisfied. As B1≥G1 and B2≥G2 are satisfied, the electrical connectivity between the band electrodes 123 and 124 and the external electrodes 131-1 and 132-1 can be further improved, and B3≤G1 and B4≤G2 are satisfied. Accordingly, the volume occupied by the external electrodes 131-1 and 132-1 may be reduced.

The average sizes B1, B2, B3, and B4 may be values obtained by averaging values measured at five points at equal intervals, in the third direction, in a cross-section of the body 110 taken in the first and second directions (an L-T cross-section).

For G1 and G2, G1 may be a value obtained by averaging sizes spaced apart from the third surface in the second direction and measured with respect to five arbitrary second internal electrodes disposed in a central portion in the first direction, and G2 may be a value obtained by averaging sizes of regions, spaced apart from the fourth surface measured with respect to five arbitrary first internal electrodes disposed in the central portion in the first direction, in the second direction, in a cross-section of the body in the third direction taken from a center thereof in the first and second directions.

Furthermore, G1 and G2 may be obtained at five points at equal intervals, in the third direction, in a cross-section of the body 110 taken in first and second directions (an L-T cross-section), and an average value of the average sizes "G1" and "G2" may be further generalized.

In addition, an end of the first band portion 131b-1 may be disposed to cover an end of the first band electrode 123, and an end of the second band portion 132b-1 may be disposed to cover an end of the second band electrode 124. That is, when an average size from an extension line E3 of a third surface 3 to an end of the first band electrode 123 in the second direction is D1, and an average size from an extension line E4 of a fourth surface 4 to an end of the second band electrode 124 in the second direction is D2, B1≥D1 and B2≥D2 may be satisfied.

D1 and D2 may be obtained at five points at equal intervals, in the third direction, in a cross-section of the body 110 taken in first and second directions (an L-T cross-section).

Figure 9:
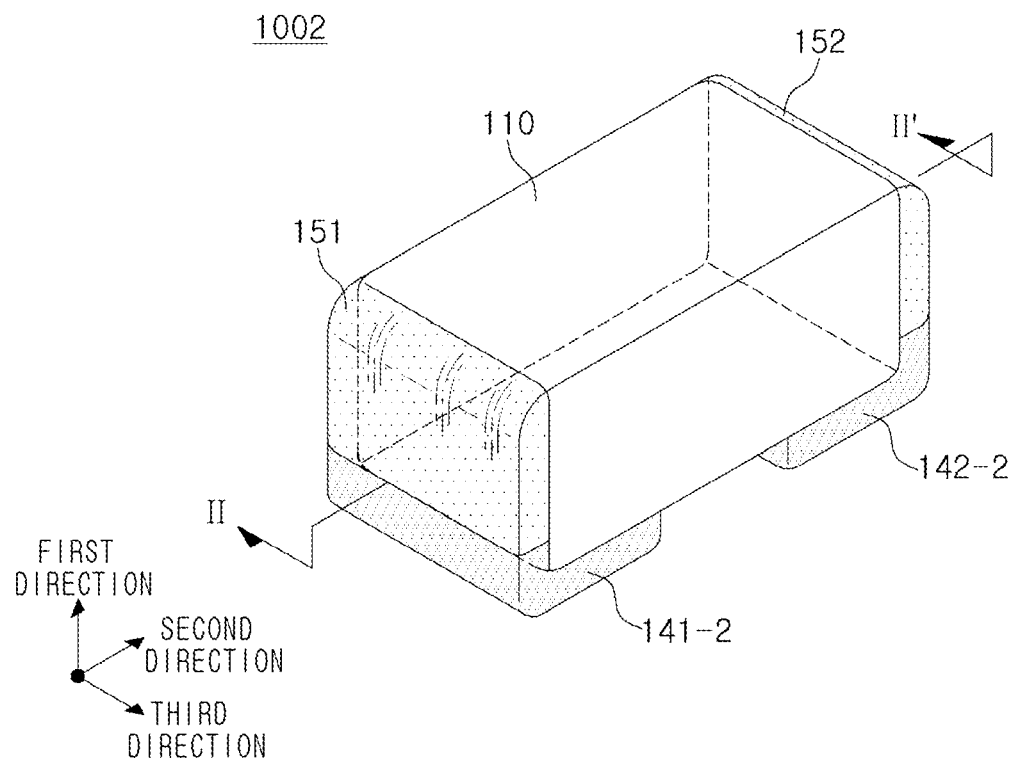
FIG. 9 is a schematic perspective view of a multilayer electronic component according to an embodiment of the present disclosure.
Figure 10:
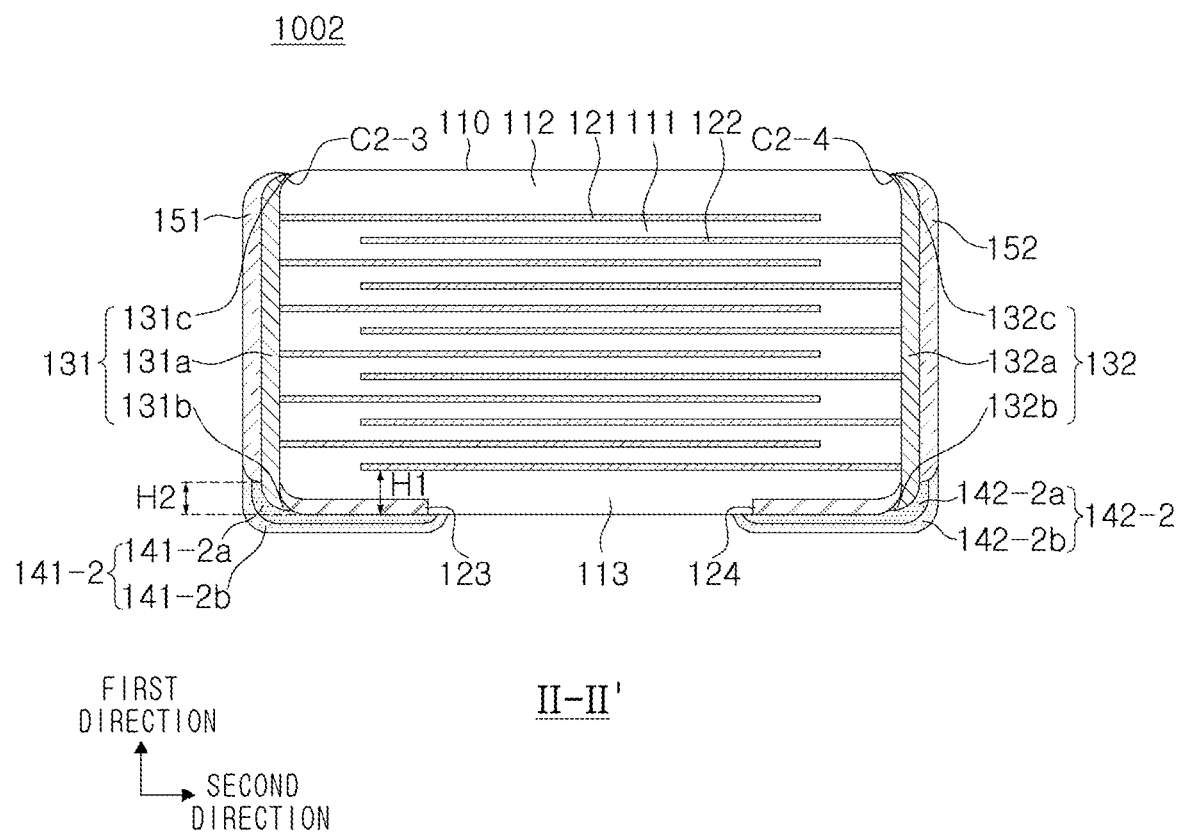
FIG. 10 is a cross-sectional view taken along line II-II' of FIG. 9.

FIG. 9 is a schematic perspective view of a multilayer electronic component 1002 according to an embodiment of the present disclosure. FIG. 10 is a cross-sectional view taken along line II-II' of FIG. 9.

The multilayer electronic component 1002 according to an embodiment of the present disclosure may include insulating layers 151 and 152 disposed on the external electrodes 131 and 132.

The first and second insulating layers 151 and 152 may be respectively disposed on the first and second external electrodes 131 and 132.

Since the first and second external electrodes 131 and 132 are portions connected to the internal electrodes 121 and 122, they may be a path for permeation of a plating solution in a plating process or permeation of moisture during actual use. In an embodiment of the present disclosure, since the insulating layers 151 and 152 are disposed on the external electrodes 131 and 132, permeation of external moisture or permeation of the plating solution can be prevented, and it is possible to prevent that the plating layers 141-2 and 142-2 are disposed in a region, in which the insulating layers 151 and 152 are disposed among the external electrodes 131 and 132.

A material of the first and second insulating layers 151 and 152 does not need to be particularly limited. For example, the first and second insulating layers 151 and 152 may include glass, or a polymer resin. The type of the polymer resin does not need to be particularly limited. For example, the polymer resin may be at least one selected from a group consisting of an epoxy resin, an acrylic resin, ethyl cellulose, and the like.

In an embodiment, when the insulating layers 151 and 152 include a polymer resin, at least one selected from a group consisting of $TiO_2$, $BaTiO_3$, $Al_2O_3$, $SiO_2$, BaO, and the line, as an additive in addition to a polymer resin. Accordingly, bonding strength with a body or an external electrode may be improved.

A method of forming the insulating layers 151 and 152 does not need to be particularly limited, but for example, the insulating layers 151 and 152 may be formed by applying a paste on the external electrodes 131 and 132 or transferring a sheet onto the external electrodes 131 and 132.

An average thickness of the insulating layers 151 and 152 is not particularly limited, but may be, for example, 3 to 30 μm. Here, the average thickness of the insulating layers 151 and 152 may mean a value obtained by averaging a second size of the insulating layers 151 and 152 measured at five points having equal intervals on the connection portions 131a and 132a.

The first and second plating layers 141-2 and 142-2 may be disposed on the first and second band electrodes 123 and 124. The first and second plating layers 141-2 and 142-2 serve to improve mounting characteristics. The type of the first and second plating layers 141-2 and 142-2 is not particularly limited, and may be a plating layer including at least one of Ni, Sn, Pd, and alloys thereof, and may be formed of a plurality of layers.

As a more specific example of the first and second plating layers 141-2 and 142-2, the first plating layer 141-2 may have a form in which a Ni plating layer 141-2a and a Sn plating layer 141-2b are sequentially formed on the first band electrode 123, and the second plating layer 142-2 may have a form in which a Ni plating layer 142-2a and a Sn plating layer 142-2b are sequentially formed on the second band electrode 124.

In addition, the first and second plating layers 141-2 and 142-2 may be disposed to extend to partially cover the first and second external electrodes 131 and 132, respectively.

When an average size from a first surface 1 to an internal electrode disposed to be closest to the first surface 1, among the first and second surfaces 121 and 122 in a first direction is H1, an average size from an extension line of the first surface 1 to ends of first and second plating layers 141-2 and 142-2 disposed on the first and second external electrodes 131 and 132 in the first direction is H2, H1>H2 (or H1≥H2) may be satisfied. Accordingly, it is possible to suppress the permeation of the plating solution into the internal electrode during the plating process, thereby improving reliability.

The average sizes "H1" and "H2" may be values obtained by averaging values measured at five points at equal intervals, in the third direction, in a cross-section of the body 110 taken in the first and second directions (an L-T cross-section). The average size "H1" may be an average of values measured at a point in which an internal electrode disposed to be closest to the first surface 1 is connected to an external electrode in each cross-section, and the average size "H2" may be an average of values measured based on an end of the plating layer in contact with the external electrode in each cross-section. Extension lines of the first surface, serving as a reference when the average sizes "H1" and "H2" are measured, may be the same.

In an embodiment, the first and second insulating layers 151 and 152 may be disposed to directly contact the first and second external electrodes 131 and 132, respectively, and the first and second external electrodes 131 and 132 may include a conductive metal and glass. Accordingly, since the plating layers 141-2 and 142-2 may not be disposed on a region, in which the insulating layers 151 and 152 are disposed, among outer surfaces of the first and second external electrodes 131 and 132, it is possible to effectively prevent erosion of external electrodes by the plating solution.

In an embodiment, the first plating layer 141-2 may be disposed to cover an end disposed on the first external electrode 131 of the first insulating layer 151, and the second insulating layer 141-2 may be disposed to cover an end disposed on the second external electrode 132 of the second insulating layer 152. Accordingly, the reliability of the multilayer electronic component 1002 may be improved by strengthening bonding strength between the insulating layers 151 and 152 and the plating layers 141-2 and 142-2. In addition, by first forming the first and second insulating layers 151 and 152 before forming the plating layers 141-2 and 142-2 on the external electrodes 131 and 132, permeation of a plating solution in a process of forming the plating layer may be more reliably suppressed. As the insulating layer is formed before the plating layer, the plating layers 141-2 and 142-2 may have a shape covering the ends of the insulating layers 151 and 152.

In an embodiment, the first insulating layer 151 may be disposed to cover an end disposed on the first external electrode 231 of the first external electrode 131 of the first plating layer 141-2, and the second insulating layer 152 may be disposed to cover an end disposed on the second external electrode 132 of the second plating layer 141-2. Accordingly, the reliability of the multilayer electronic component 1002 may be improved by strengthening bonding strength between the insulating layers 151 and 152 and the plating layers 141-2 and 142-2.

Figure 11:
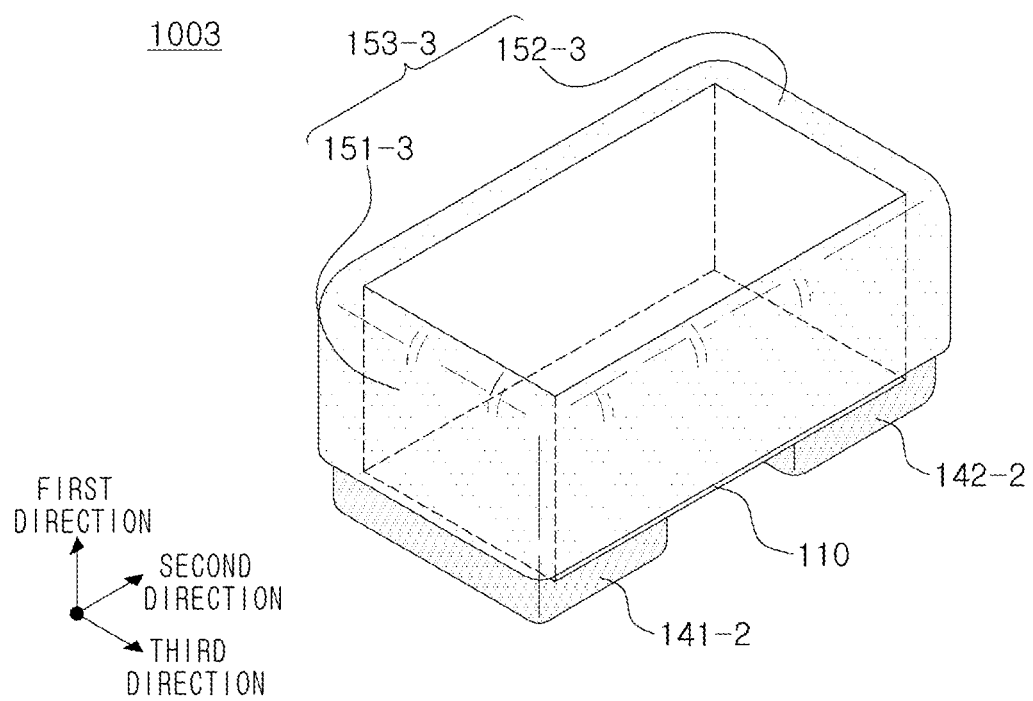
FIG. 11 illustrates a modified example of FIG. 9.

FIG. 11 illustrates a modified example of FIG. 9. Referring to FIG. 11, in a modified example 1003 of the multilayer electronic component 1002 according to an embodiment of the present disclosure, first and second insulating layers 151-3 and 152-3 may extend onto the fifth and sixth surfaces 5 and 6, and be connected to each other, so as to be connected to one insulating layer 153-3. In this case, the connected first and second insulating layers 153-3 may be disposed to cover portions of the fifth and sixth surfaces.

Figure 12:
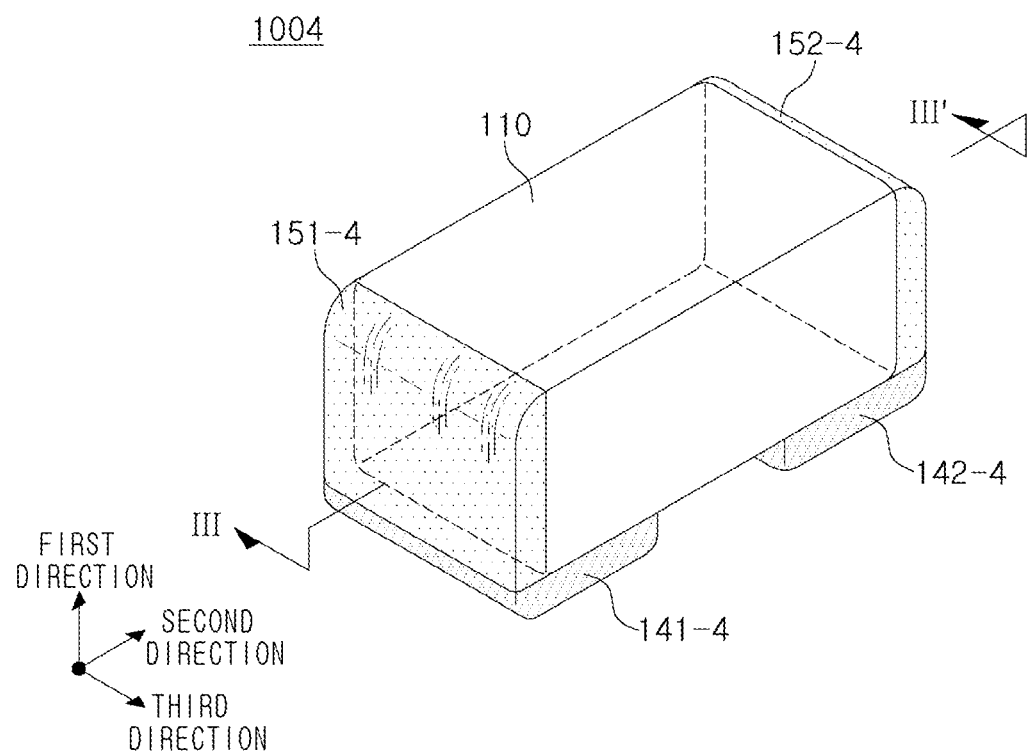
FIG. 12 is a schematic perspective view of a multilayer electronic component according to an embodiment of the present disclosure.
Figure 13:
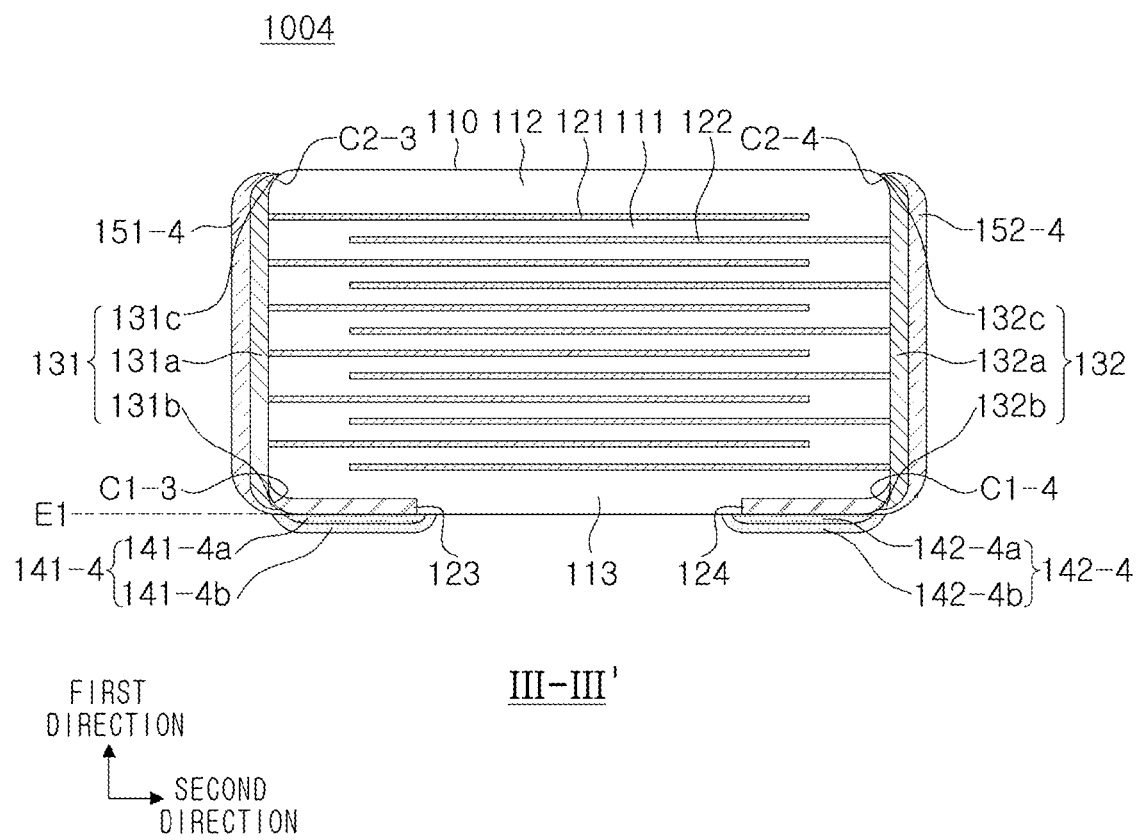
FIG. 13 is a cross-sectional view taken along line III-III' of FIG. 12.

FIG. 12 is a schematic perspective view of a multilayer electronic component 1004 according to an embodiment of the present disclosure. FIG. 13 is a cross-sectional view taken along line III-III' of FIG. 12.

Referring to FIGS. 12 and 13, in the multilayer electronic component 1001 according to an embodiment, first and second plating layers 141-4 and 142-4 may be disposed on a level the same as or lower than a level of an extension line E1 of a first surface. Accordingly, during mounting, a height of a solder may be minimized and a mounting space may be significantly reduced. In this case, the external electrodes 131 and 132 and the plating layers 141-4 and 141-5 may not directly contact each other. The first plating layer 141-4 may have a form in which a Ni plating layer 141-4a and a Sn plating layer 141-4b are sequentially formed on the first band electrode 123, and the second plating layer 142-4 may have a form in which a Ni plating layer 142-4a and a Sn plating layer 142-4b are sequentially formed on the second band electrode 124.

Alternatively, the first and second insulating layers 151-4 and 152-4 may be disposed to extend onto a level the same or lower than a level of an extension line E1 of a first surface, to be in contact with the first and second plating layers 141-4 and 142-4.

Figure 14:
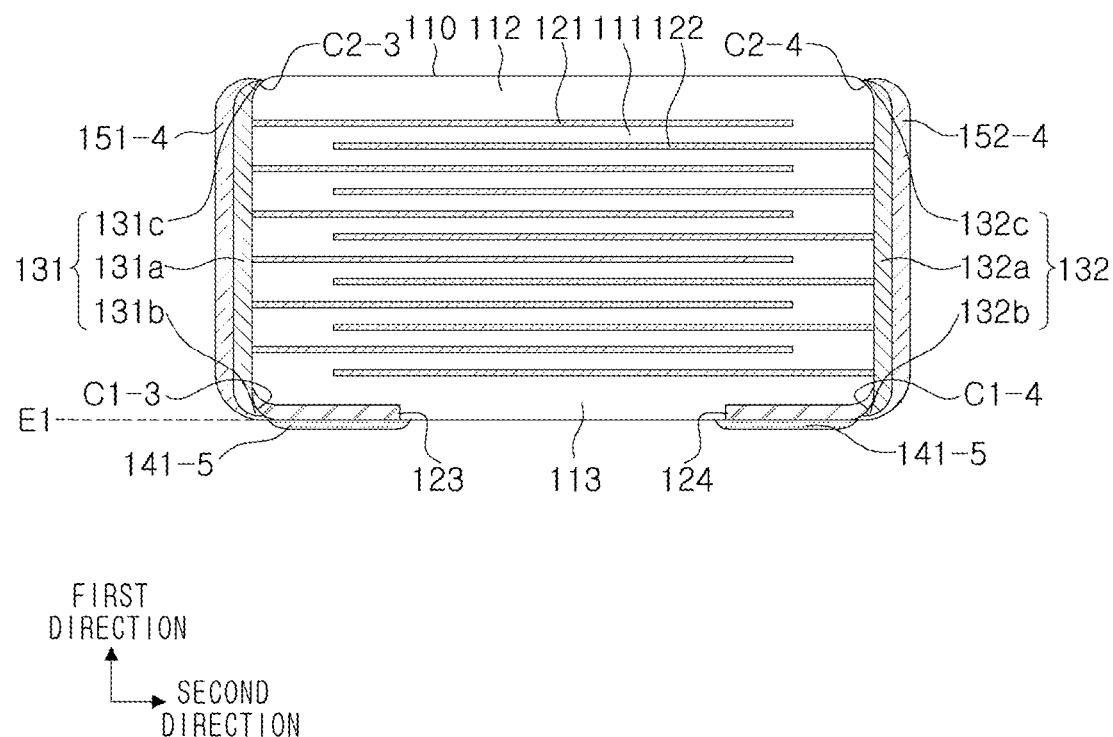
FIG. 14 illustrates a modified example of FIG. 13.

FIG. 14 illustrates a modified example of FIG. 13. Referring to FIG. 14, in the multilayer electronic component 1005 according to the modified example of FIG. 13, plating layers 141-5 and 142-5 may be disposed in monolayer form instead of multilayer form. Accordingly, an effect of improving the capacitance per unit volume may be further improved. In this case, the plating layers 141-5 and 142-5 may be Sn plating layers.

Figure 15:
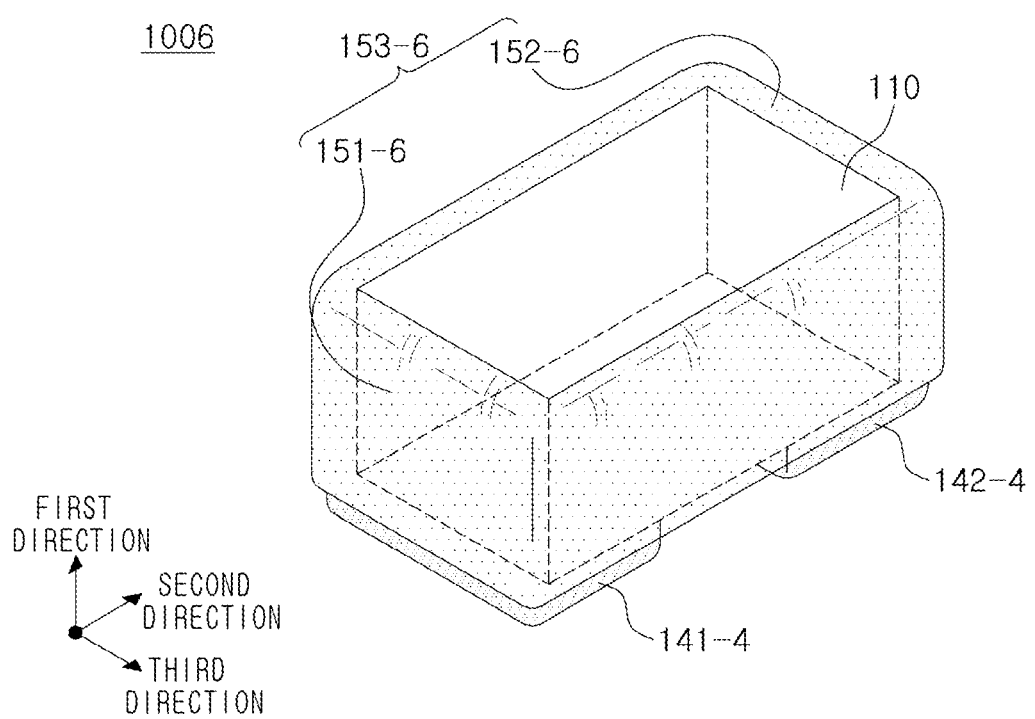
FIG. 15 illustrates a modified example of FIG. 12.

FIG. 15 illustrates a modified example of FIG. 12. Referring to FIG. 12, in a modified example 1006 of the multilayer electronic component 1004 according to an embodiment of the present disclosure, first and second insulating layers 151-6 and 152-6 may extend onto the fifth and sixth surfaces 5 and 6 and connected to each other, so as to be connected to one insulating layer 153-6. In this case, the connected first and second insulating layer 153-6 may be disposed to cover an entirety of the fifth and sixth surfaces.

Figure 16:
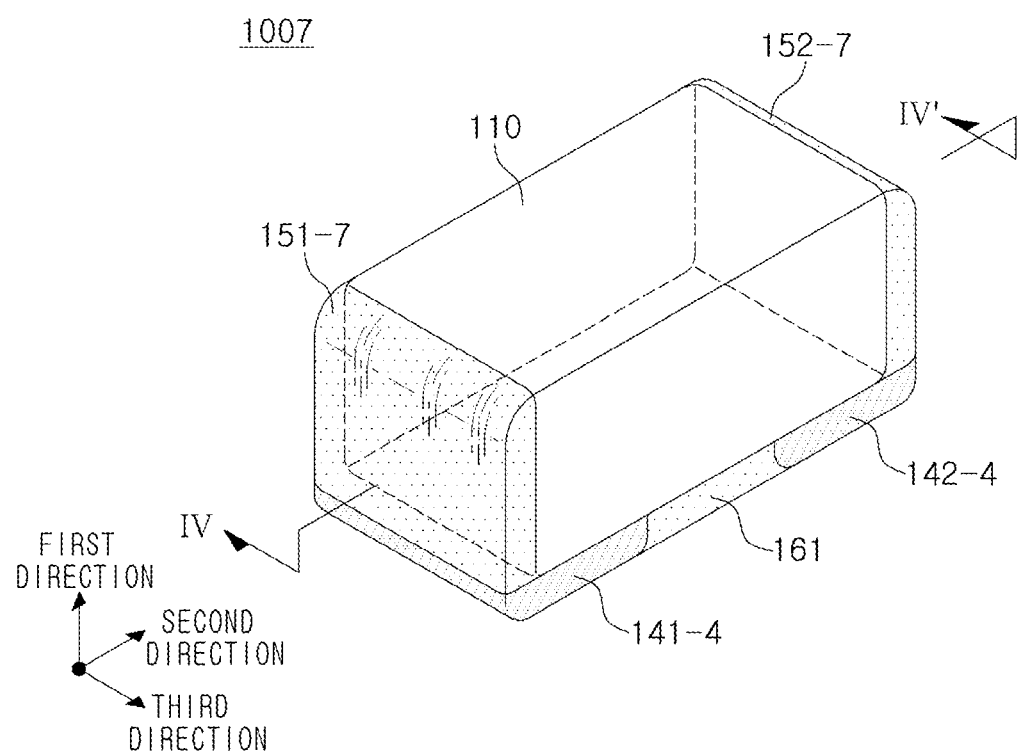
FIG. 16 is a schematic perspective view of a multilayer electronic component according to an embodiment of the present disclosure.
Figure 17:
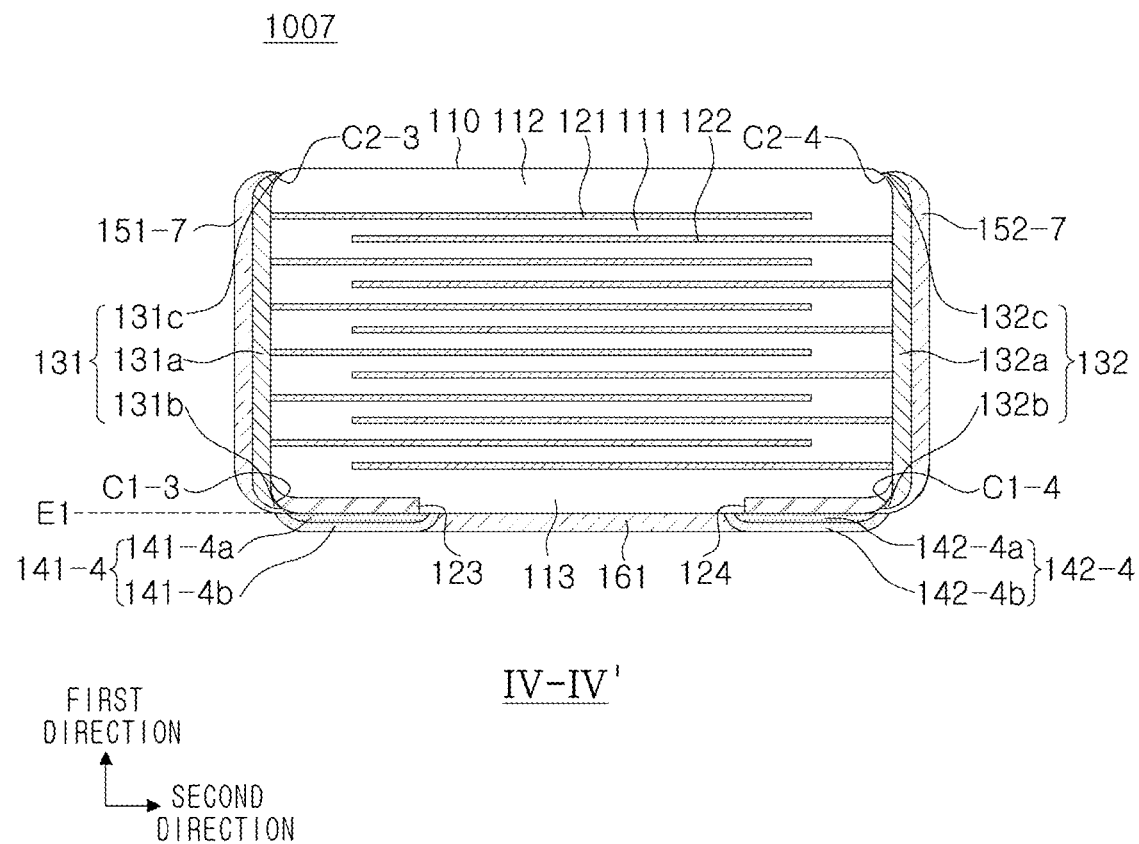
FIG. 17 is a cross-sectional view taken along line IV-IV' of FIG. 16.

FIG. 16 schematically illustrates a perspective view of a multilayer electronic component 1007 according to an embodiment of the present disclosure. FIG. 17 is a cross-sectional view taken along line IV-IV' of FIG. 16.

Referring to FIGS. 16 and 17, the multilayer electronic component 1007 according to an embodiment of the present disclosure may further include an additional insulating layer 161 disposed on the first surface 1 and disposed between the first plating layer 141-4 and the second plating layer 142-4. Accordingly, it is possible to prevent a leakage current, or the like, that may occur between the first band electrode 123 and the second band electrode 124 under a high-voltage current.

The type of the additional insulating layer 161 does not need to be limited. For example, the additional insulating layer 161 may include glass or a polymer resin. For example, the polymer resin may include at least one selected from the group consisting of an epoxy resin, an acrylic resin, ethyl cellulose, and the like, or may include glass. In an embodiment, when the additional insulating layer 161 includes a polymer resin, the additional insulating layer 161 may include at least one selected from $TiO_2$, $BaTiO_3$, $Al_2O_3$, $SiO_2$, BaO, and the like, as an additive in addition to a polymer resin. Accordingly, bonding strength with a body or an external electrode may be improved.

Meanwhile, the additional insulating layer 161 and the insulating layers 151-7 and 152-7 do not need to be formed of the same material, but may be formed of different materials.

Figure 18:
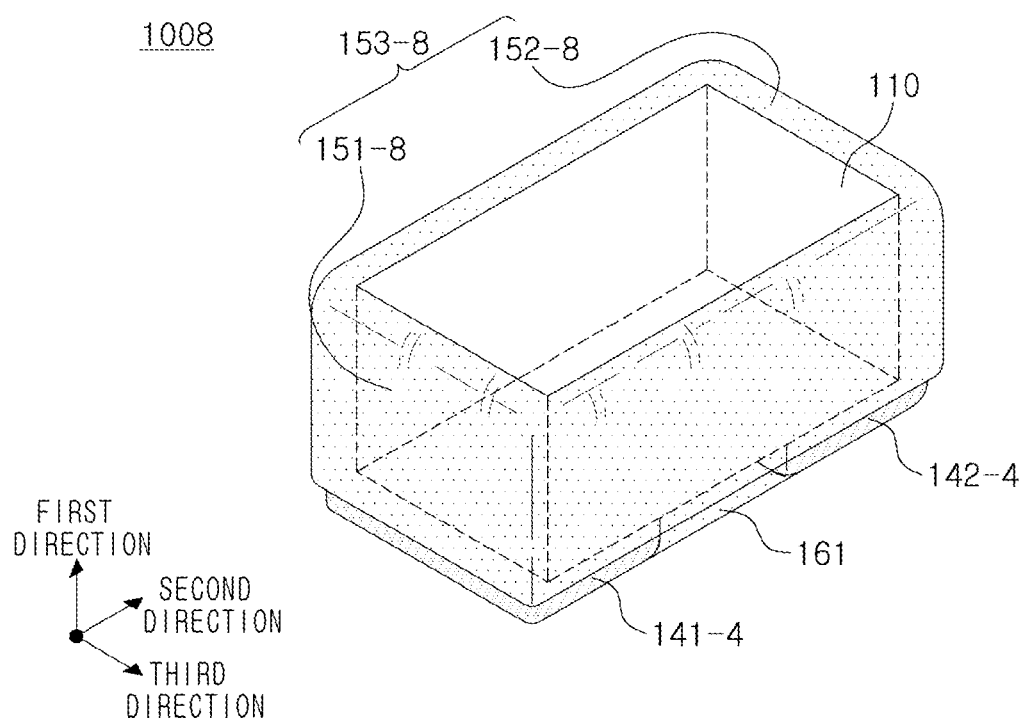
FIG. 18 illustrates a modified example of FIG. 16.

FIG. 18 illustrates a modified example of FIG. 16. Referring to FIG. 18, in a modified example 1008 of the multilayer electronic component 1007 according to an embodiment of the present disclosure, first and second insulating layers 151-8 and 152-8 may extend onto the fifth and sixth surfaces 5 and 6 to be connected to each other to constitute a single insulating layer 153-8.

Figure 19:
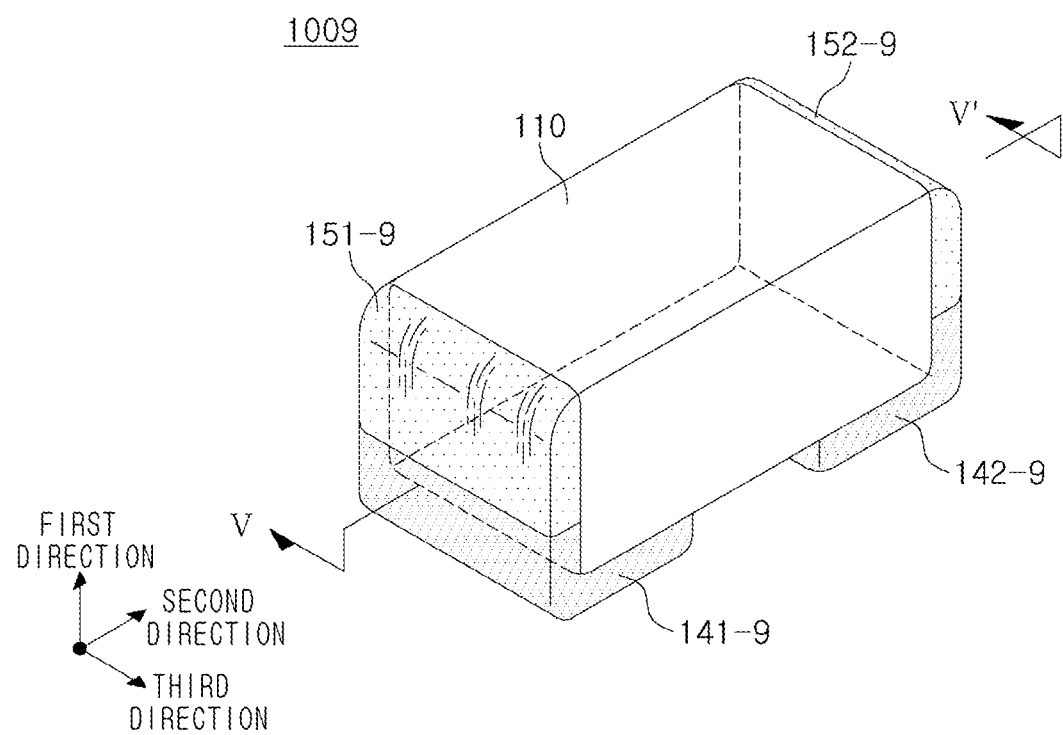
FIG. 19 is a schematic perspective view of a multilayer electronic component according to an embodiment in the present disclosure.
Figure 20:
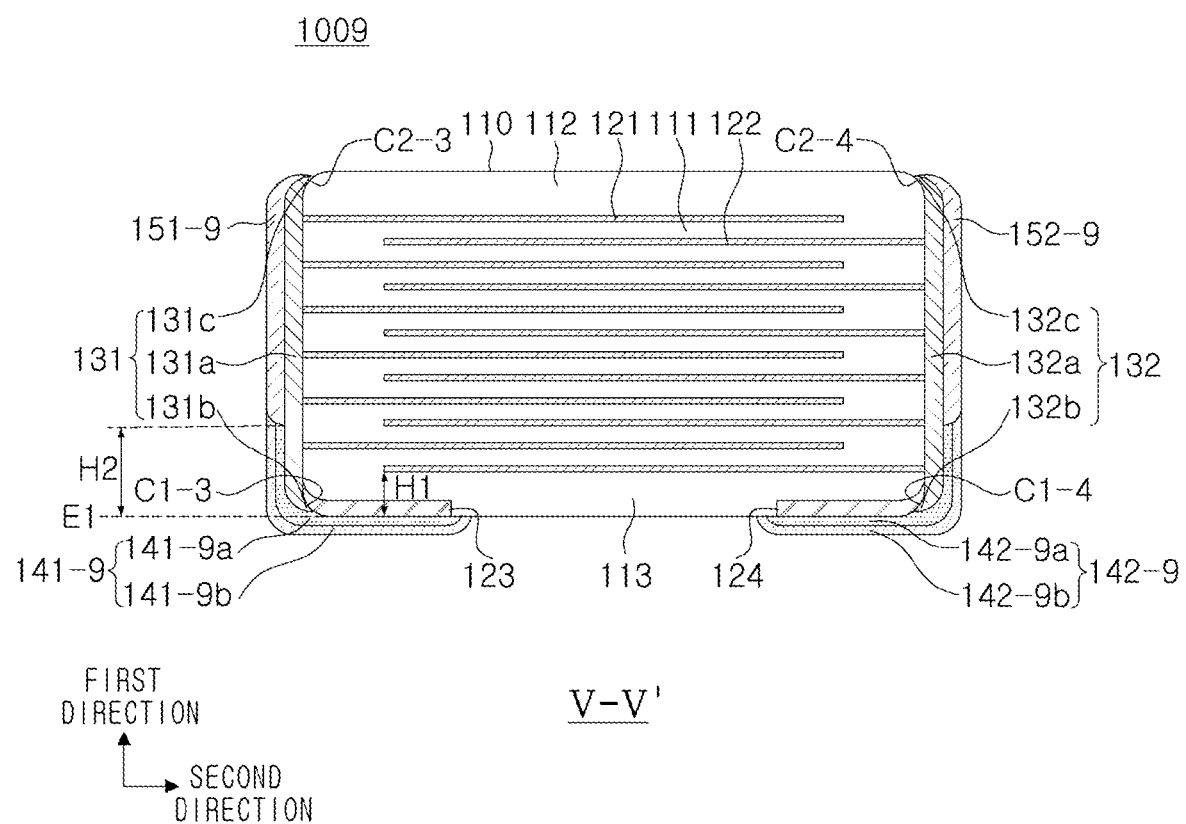
FIG. 20 is a cross-sectional view taken along line V-V' of FIG. 19.

FIG. 19 is a schematic perspective view of a multilayer electronic component 1009 according to an embodiment of the present disclosure. FIG. 20 is a cross-sectional view taken along line V-V' of FIG. 19.

Referring to FIGS. 19 and 20, the multilayer electronic component 1009 according to an embodiment may include a first insulating layer 151-9 disposed on the first external electrode 131, and a second insulating layer 152-9 disposed on the second external electrode 132, wherein, when an average size from a first surface 1 to an internal electrode disposed to be closest to the first surface 1, among the first and second internal electrodes 121 and 122, in a first direction is H1, and an average size from an extension line E1 of the first surface 1 to ends of plating layers 141-9 and 142-9 disposed on the first and second external electrodes 131 and 132 in a first direction is H2, H1<H2 may be satisfied. The first plating layer 141-9 may have a form in which a Ni plating layer 141-9a and a Sn plating layer 141-9b are sequentially formed on the first band electrode 123, and the second plating layer 142-9 may have a form in which a Ni plating layer 142-9a and a Sn plating layer 142-9b are sequentially formed on the second band electrode 124. Accordingly, by increasing an area in contact with a solder during mounting, adhesion strength may be improved.

More preferably, when an average size of the body 110 in the first direction is T, H2<T/2 may be satisfied. That is, H1<H2<T/2 may be satisfied. When H2 is T/2 or more, there is a concern that a moisture-resistance reliability improvement effect by an insulating layer may decrease.

The average sizes "H1", "H2", and "T" may be values obtained by averaging values measured in cross sections (L-T cross-sections) of the body 110 cut in the first and second directions at five points having equal intervals in the third direction. H1 may be a value obtained by averaging values measured at a point at which the internal electrode disposed closest to the first surface 1 in each cross-section is connected to an external electrode, and H2 may be a value obtained by averaging values measured based on an end of the plating layer in contact with the external electrode in each cross-section, and an extension line E1 of the first surface 1, serving as a reference, when measuring H1 and H2 may be the same. In addition, T may be an average value after measuring a maximum size of the body 110 in the first direction in each cross-section.

Figure 21:
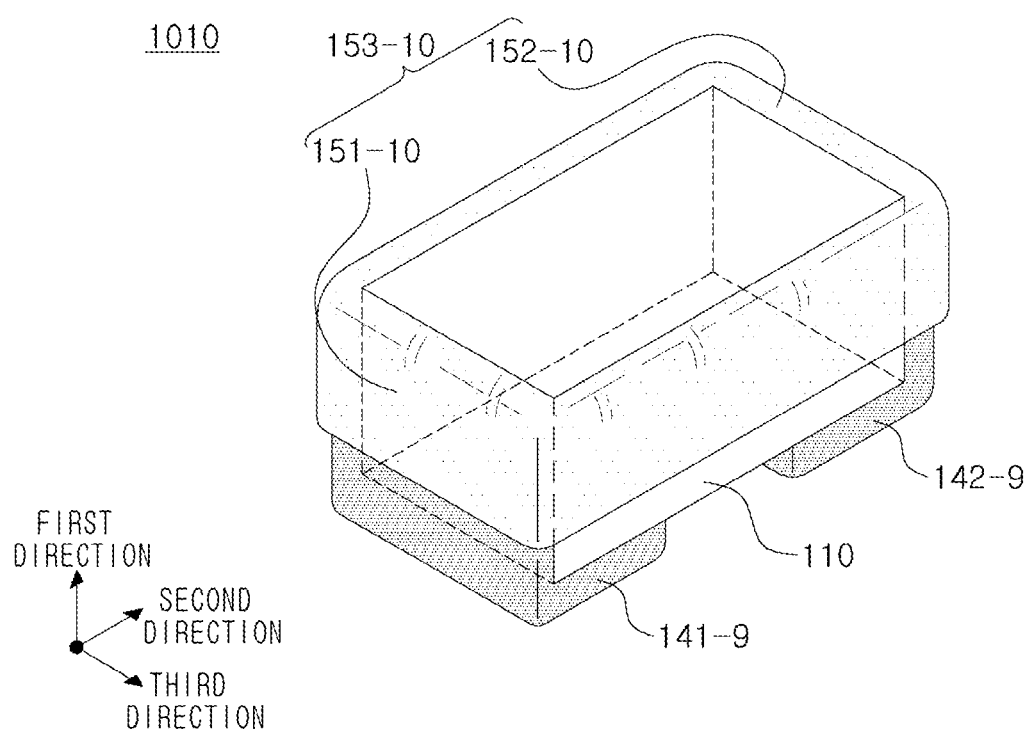
FIG. 21 illustrates a modified example of FIG. 19.

FIG. 21 illustrates a modified example of FIG. 19. Referring to FIG. 21, in a modified example 1010 of the multilayer electronic component 1009 according to an embodiment of the present disclosure, first and second insulating layers 151-10 and 152-10 may extend onto the fifth and sixth surfaces 5 and 6 to be connected to each other to constitute a single insulating layer 153-10.

Figure 22:
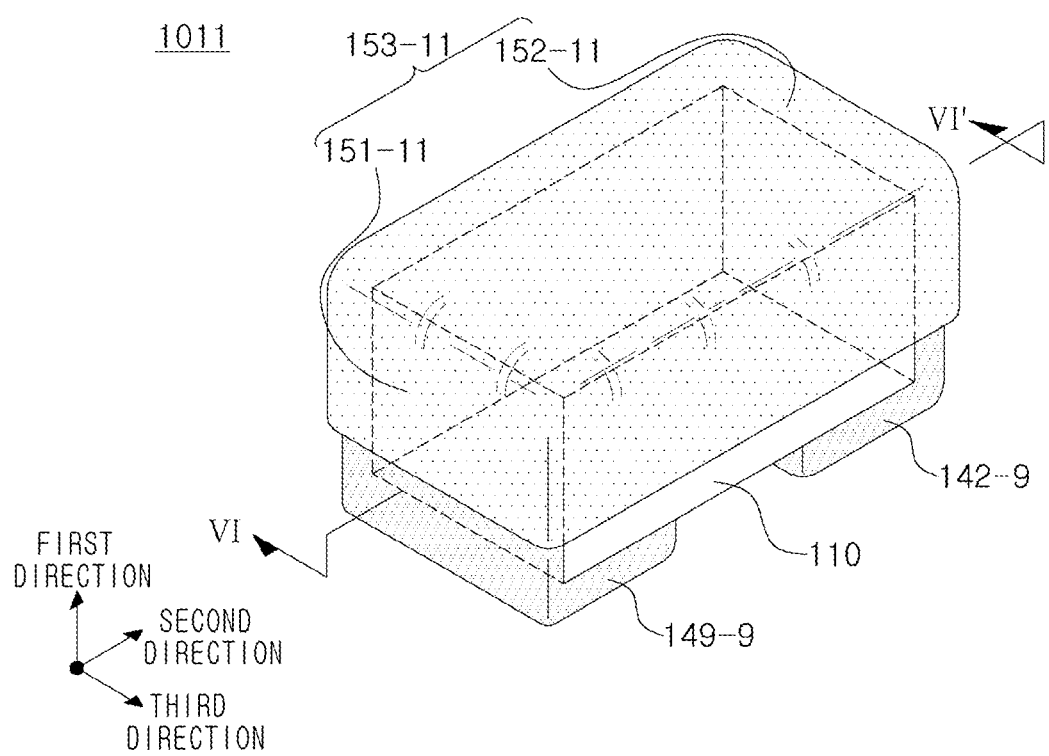
FIG. 22 is a schematic perspective view of a multilayer electronic component according to an embodiment of the present disclosure.
Figure 23:
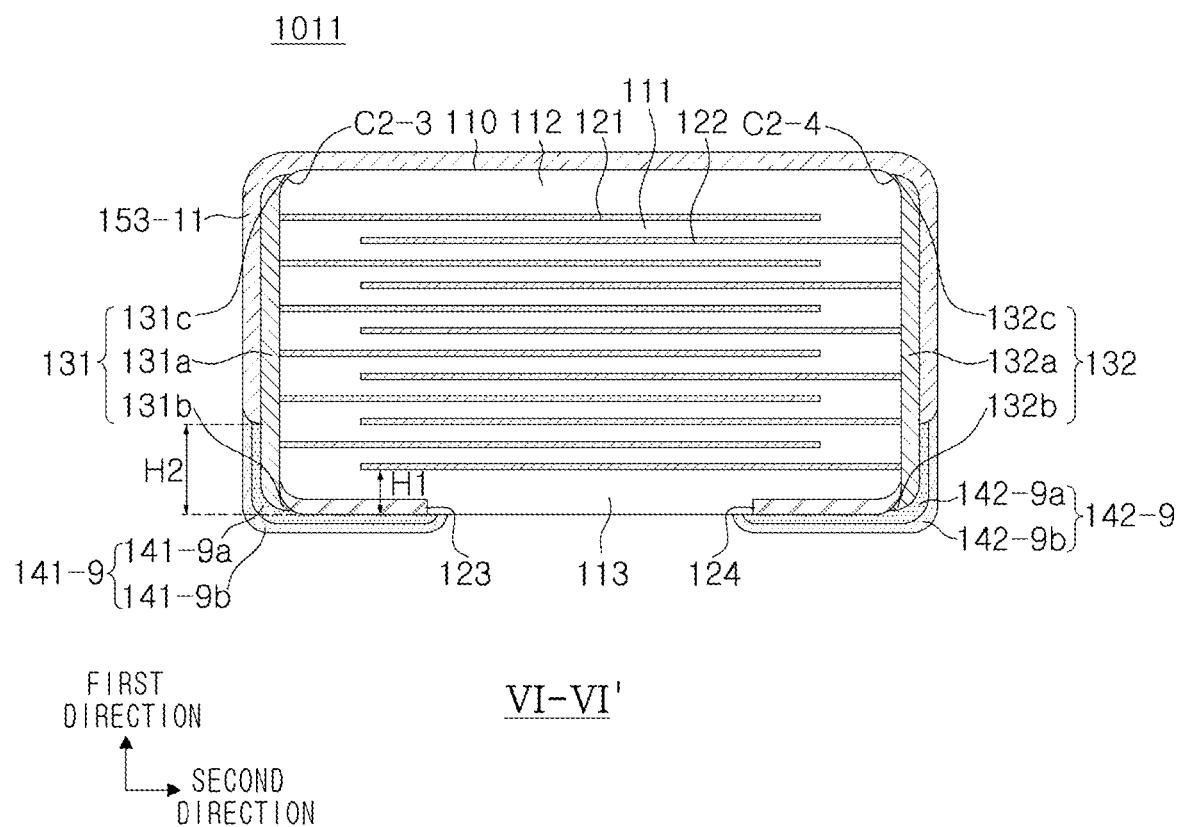
FIG. 23 is a cross-sectional view taken along line VI-VI' of FIG. 22.

FIG. 22 is a schematic perspective view of a multilayer electronic component 1011 according to an embodiment of the present invention. FIG. 23 is a cross-sectional view taken along VI-VI' of FIG. 22.

Referring to FIGS. 22 and 23, in the multilayer electronic component 1011 according to an embodiment of the present disclosure, first and second insulating layers 151-11 and 152-11 may extend onto the second, fifth, and sixth surfaces 2, 5, and 6 to be connected to each other to constitute a single insulating layer 153-11. As illustrated in FIG. 22, the insulating layer 253-8 may cover the entirety of second surface, and may cover only portions of the fifth and sixth surfaces.

Figure 24:
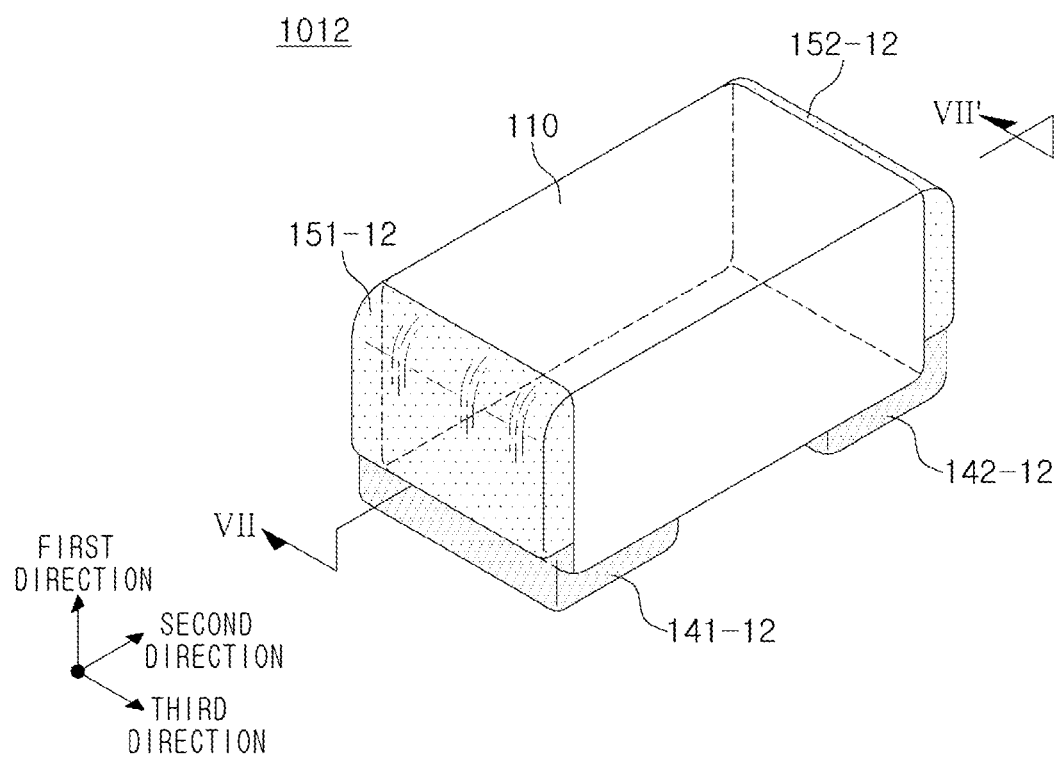
FIG. 24 is a schematic perspective view of a multilayer electronic component according to an embodiment of the present disclosure.
Figure 25:
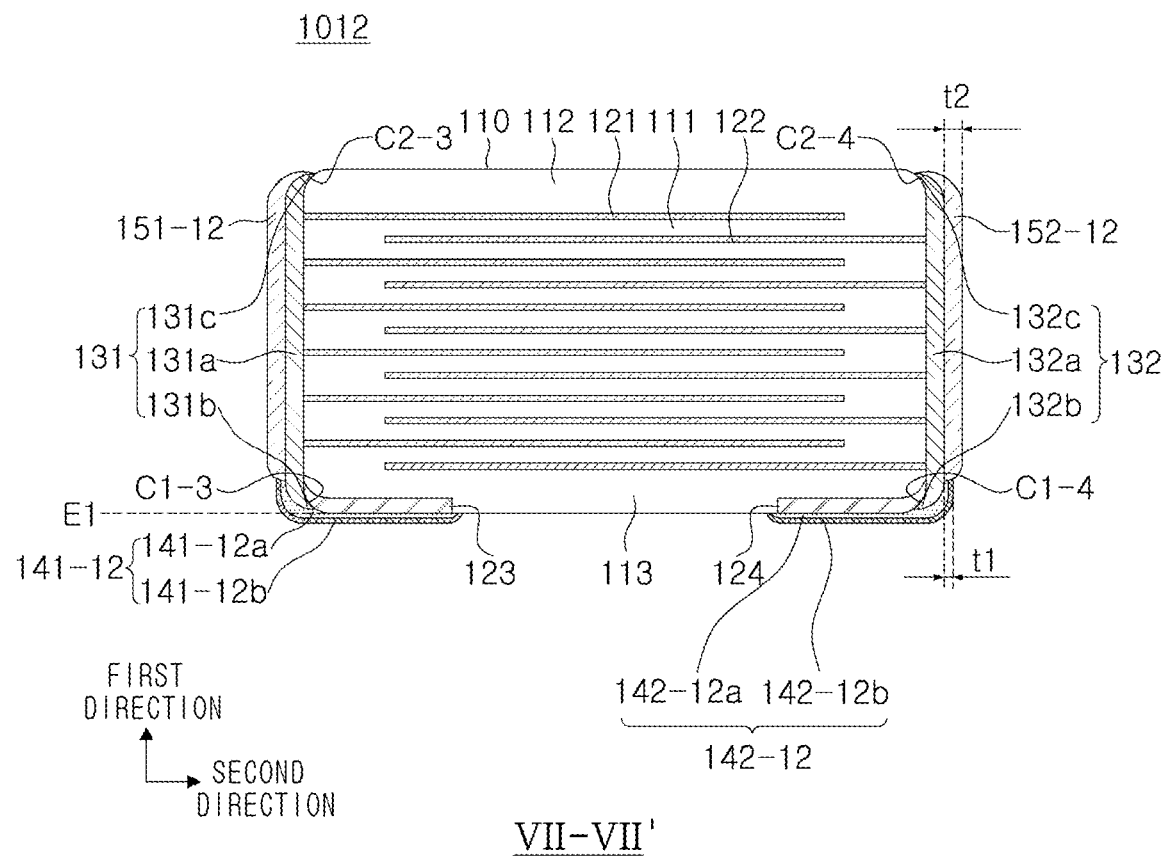
FIG. 25 is a cross-sectional view taken along line VII-VII' of FIG. 24.

FIG. 24 is a schematic perspective view of a multilayer electronic component 1012 according to an embodiment of the present invention. FIG. 25 is a cross-sectional view taken along line VII-VII' of FIG. 24.

Referring to FIGS. 24 and 25, an average thickness t1 of first and second plating layers 141-12 and 142-12 of the multilayer electronic component 1012 according to an embodiment of the present disclosure may be thinner than an average thickness t2 of first and second insulating layers 151-12 and 152-12.

According to an embodiment of the present disclosure, the average thickness t1 of the first and second plating layers 141-12 and 142-12 may be thinner than the average thickness t2 of the first and second insulating layers 151-12 and 152-12, so that an area in which the plating layers and the insulating layer are in contact with each other, may be reduced, thereby suppressing occurrence of delamination and improving the adhesion strength of the multilayer electronic component 1012 to the substrate 180.

The average thickness t1 of the first and second plating layers 141-12 and 142-12 may be a value obtained by averaging thicknesses measured at five points at equal intervals on the first and second external electrodes 131 and 132 or the first and second band electrodes 123 and 124, and the average thickness t2 of the insulating layers 151-12 and 152-12 may be a value obtained by averaging thicknesses measured at five points at equal intervals on the first and second external electrodes 131 and 132. The first plating layer 141-12 may have a form in which a Ni plating layer 141-12a and a Sn plating layer 141-12b are sequentially formed on the first band electrode 123, and the second plating layer 142-12 may have a form in which a Ni plating layer 142-12*a* and a Sn plating layer 142-12*b* are sequentially formed on the second band electrode 124.

Figure 26:
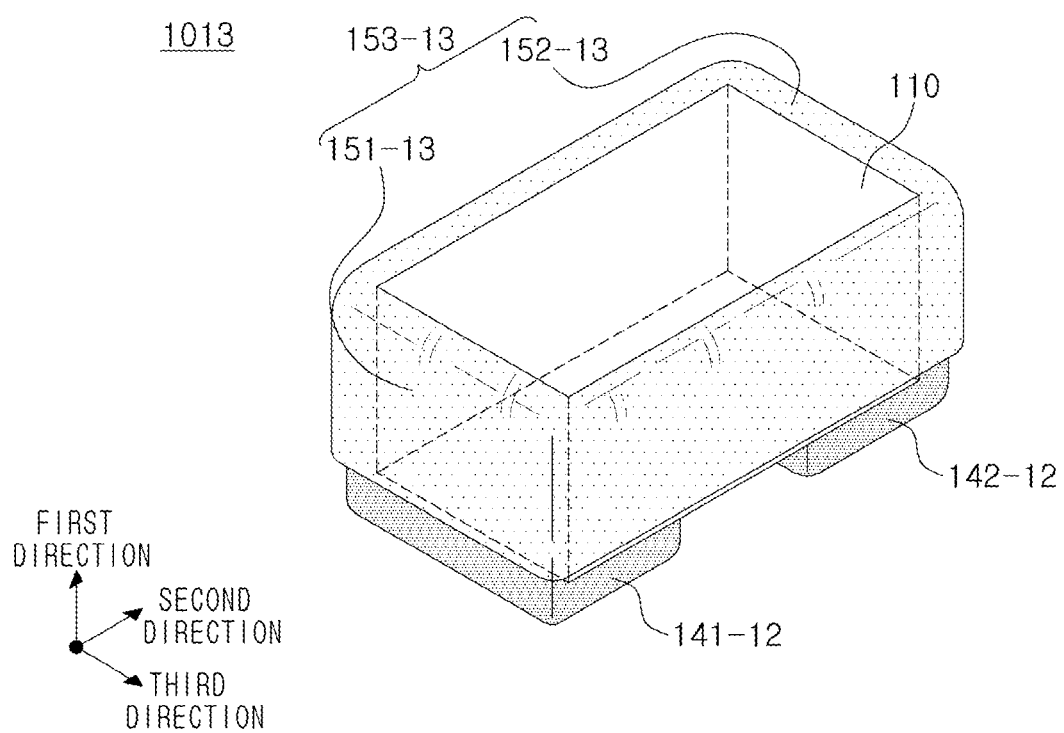
FIG. 26 illustrates a modified example of FIG. 24.

FIG. 26 illustrates a modified example of FIG. 24. Referring to FIG. 26, in a modified example 1013 of the multilayer electronic component 1012 according to an embodiment of the present disclosure, first and second insulating layers 151-13 and 152-13 may extend onto the fifth and sixth surfaces 5 and 6 to be connected to each other to constitute a single insulating layer 153-13.

Figure 27:
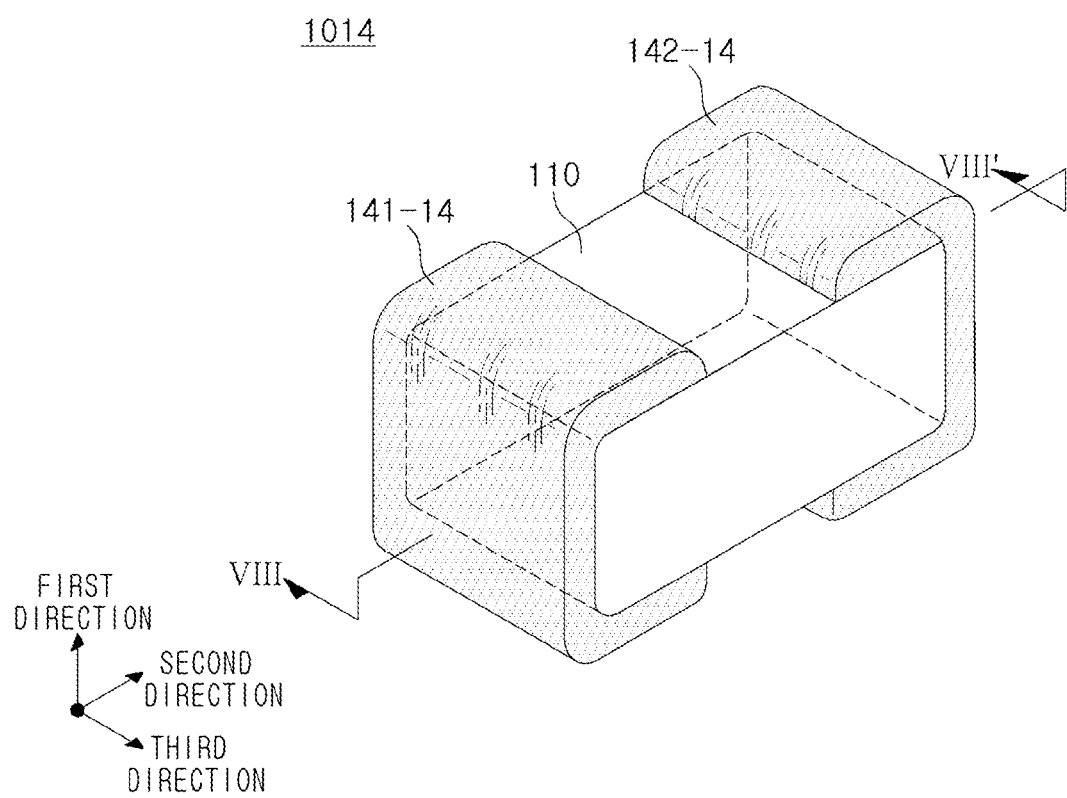
FIG. 27 is a schematic perspective view of a multilayer electronic component according to an embodiment of the present disclosure.
Figure 28:
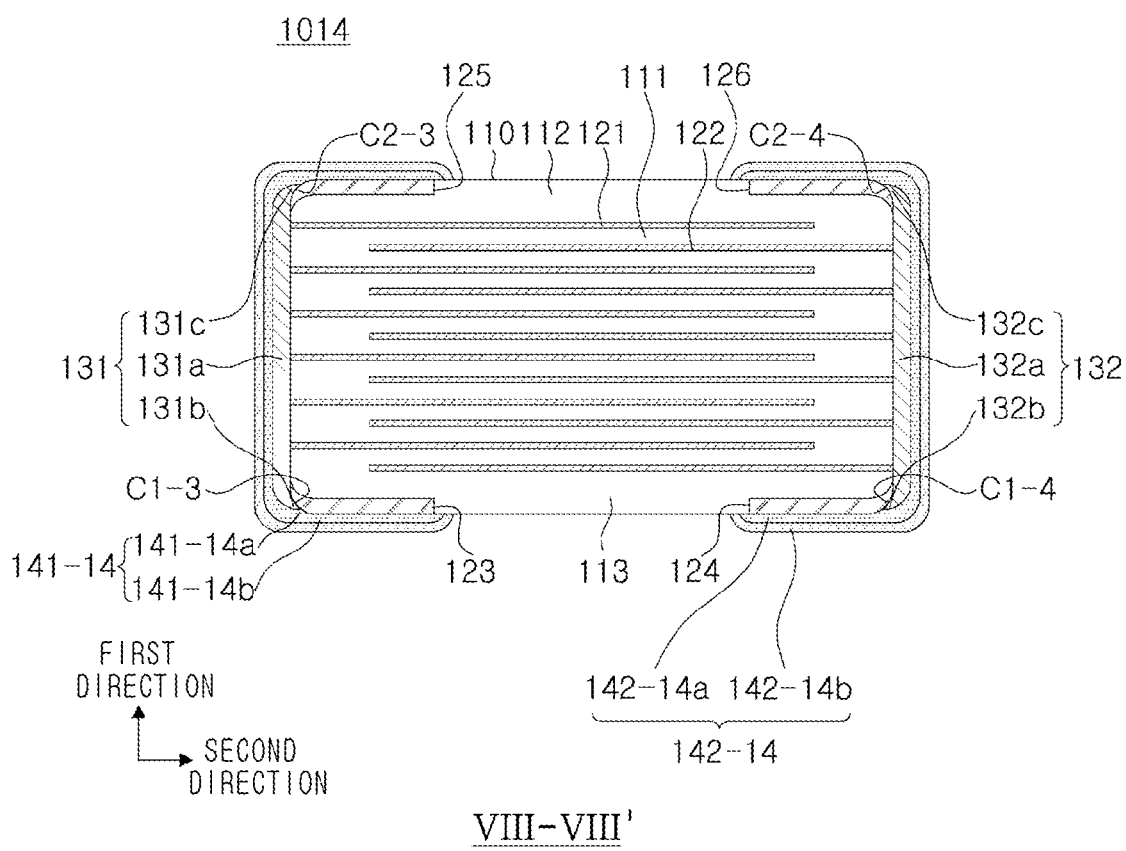
FIG. 28 is a cross-sectional view taken along line VIII-VIII' of FIG. 27.

FIG. 27 is a schematic perspective view of a multilayer electronic component 1014 according to an embodiment of the present disclosure. FIG. 28 is a cross-sectional view taken along line VIII-VIII' of FIG. 27.

Referring to FIGS. 27 and 28, according to an embodiment of the present disclosure, a second surface of the body 110 may include a third band electrode 125 and a fourth band electrode 126 disposed to be spaced apart from each other, and the third band electrode 125 may be connected to a first external electrode 13 and the fourth band electrode 126 may be connected to a second external electrode 132. When only the first and second band electrodes 123 and 124 are disposed, mounting convenience and taping efficiency may be reduced, and an additional process may be required to improve productivity and efficiency. On the other hand, when the third and fourth band electrodes 124 and 125 are included according to an embodiment of the present disclosure, mounting convenience and taping efficiency may be improved twice compared to a case in which only the first and second band electrodes 123 and 124 are disposed.

In this case, a first plating layer 141-14 may be additionally disposed on the third band electrode 125, and a second plating layer 142-14 may be additionally disposed on the fourth band electrode 126. The first plating layer 141-14 may have a form in which a Ni plating layer 141-14*a* and a Sn plating layer 141-14*b* are sequentially formed, and the second plating layer 142-14 may have a form in which a Ni plating layer 142-14*a* and a Sn plating layer 142-14*b* are sequentially formed.

In addition, the third and fourth band electrodes 125 and 126 may have the characteristics of the above-described first and second band electrodes 123 and 124, and the third band electrode 125 may be symmetrical in a first direction, and the fourth band electrode 126 may be symmetrical in a first direction.

Meanwhile, when the insulating layers are disposed on the first and second external electrodes 131 and 132, a plating layer formed on the first band electrode 123 and a plating layer formed on the third band electrode 125 may be disposed to be spaced apart from each other by the first insulating layer, and a plating layer formed on the second band electrode 124 and a plating layer formed on the fourth band electrode 126 may be disposed to be spaced apart from the second insulating layer.

As set forth above, as one of the various effects of the present disclosure, a mounting space of the multilayer electronic component may be minimized by including a band electrode on one surface of the body.

As one of the various effects of the present disclosure, reliability may be improved while improving capacitance per unit volume of the multilayer electronic component, by disposing an insulating layer on the external electrode and a plating layer on the band electrode.

However, various and beneficial advantages and effects of the present disclosure are not limited to the above, and will be more easily understood in the course of describing specific embodiments of the present disclosure.

In addition, the expression 'an embodiment' used in the present disclosure does not mean the same embodiment as each other, and is provided to emphasize and explain different unique features. However, an embodiment presented above is not excluded from being implemented in combination with the features of another embodiment. For example, even if a matter described in one specific embodiment is not described in another embodiment, it may be understood as a description related to another embodiment unless a description contradicts or contradicts the matter in another embodiment.

The terms used in the present disclosure are used to describe only one embodiment, and are not intended to limit the present disclosure. In this case, the singular expression includes the plural expression unless the context clearly indicates otherwise.

While example embodiments have been shown and described above, it will be apparent to those skilled in the art that modifications and variations could be made without departing from the scope of the present invention as defined by the appended claims.

What is claimed is:

1. A multilayer electronic component comprising:
a body including a dielectric layer and first and second internal electrodes alternately disposed with the dielectric layer interposed therebetween, the body having first and second surfaces opposing each other in a first direction, third and fourth surfaces connected to the first and second surfaces and opposing each other in a second direction, and fifth and sixth surfaces connected to the first to fourth surfaces and opposing each other in a third direction, the first surface including first and second band electrodes disposed to be spaced apart from each other;
a first external electrode disposed on the third surface and connected to the first internal electrode and the first band electrode;
a second external electrode disposed on the fourth surface and connected to the second internal electrode and the second band electrode;
a first plating layer disposed on the first external electrode and the first band electrode; and
a second plating layer disposed on the second external electrode and the second band electrode,
wherein the first and second band electrodes are buried inside the body, and the first and second band electrodes are exposed to the first surface.

2. The multilayer electronic component of claim 1, wherein the first band electrode is connected to the third surface, and the second band electrode is connected to the fourth surface.

3. The multilayer electronic component of claim 1, wherein the first and second band electrodes have an average thickness of 0.1 μm or more.

4. The multilayer electronic component of claim 1, wherein the first and second band electrodes are substantially coplanar with the first surface.

5. The multilayer electronic component of claim 1, wherein the first and second band electrodes comprise at least one of Ni, Cr, Pd, and Pt.

6. The multilayer electronic component of claim 1, wherein the first and second band electrodes comprise at least one of $BaTiO_3$, $TiO_2$, and $SiO_2$.

7. The multilayer electronic component of claim 1, wherein $D1 \geq G1$ and $D2 \geq G2$ are satisfied, in which D1 is an extension line of the third surface to an end of the first band electrode, in the second direction, D2 is an average size from an extension line of the fourth surface to an end of the second band electrode, in the second direction, G1 is an average size of a region, in which the third surface and the second internal electrode are spaced apart from each other, in the second direction, and G2 is an average size of a region, in which the fourth surface and the first internal electrode are spaced apart from each other, in the second direction.

8. The multilayer electronic component of claim 1, wherein $0.2 \leq D1/L \leq 0.4$ and $0.2 \leq D2/L \leq 0.4$ are satisfied, in which L is an average size of the body in the second direction, D1 is an average size from an extension line of the third surface to an end of the first band electrode in the second direction, and D2 is an average size from an extension line of the fourth surface to an end of the second band electrode in the second direction.

9. The multilayer electronic component of claim 1, wherein the first external electrode comprises a first connection portion disposed on the third surface, a first corner portion disposed to extend from the first connection portion onto a corner connecting the first and third surfaces, and a third corner portion disposed to extend from the first connection portion onto a corner connecting the second and third surfaces, the second external electrode comprises a second connection portion disposed on the fourth surface, a second corner portion disposed to extend from the second connection portion onto a corner connecting the first and third surfaces, and a fourth corner portion disposed to extend from the second connection portion onto a corner connecting the second and fourth surfaces, and $B1 \leq G1$, $B3 \leq G1$, $B2 \leq G2$ and $B4 \leq G2$ are satisfied, in which B1 is an average size from an extension line of the third surface to an end of the first corner portion in the second direction, B2 is an average size from an extension line of the fourth surface to an end of the second corner portion in the second direction, B3 is an average size from the extension line of the third surface to an end of the third corner portion in the second direction, B4 is an average size from the extension line of the fourth surface to an end of the fourth corner portion in the second direction, G1 is an average size of a region, in which the third surface and the second internal electrode are spaced apart from each other, in the second direction, and G2 is an average size of a region, in which the fourth surface and the first internal electrode are spaced apart from each other, in the second direction.

10. The multilayer electronic component of claim 1, wherein the first external electrode comprises a first connection portion disposed on the third surface, a first band portion disposed to extend from the first connection portion onto a portion of the first surface, and a third corner portion disposed to extend from the first connection portion onto a corner connecting the second and third surfaces, the second external electrode comprises a second connection portion disposed on the fourth surface, a second band portion disposed to extend from the second connection portion onto a portion of the first surface, and a fourth corner portion disposed to extend from the second connection portion onto a corner connecting the second and fourth surfaces, and $B1 \geq G1$, $B3 \leq G1$, $B2 \geq G2$ and $B4 \leq G2$ are satisfied, in which B1 is an average size from an extension line of the third surface to an end of the first band portion in the second direction, B2 is an average size from an extension line of the fourth surface to an end of the second band portion in the second direction, B3 is an average size from the extension line of the third surface to an end of the third corner portion in the second direction, B4 is an average size from the extension line of the fourth surface to an end of the fourth corner portion in the second direction, G1 is an average size of a region, in which the third surface and the second internal electrode are spaced apart from each other, in the second direction, and G2 is an average size of a region, in which the fourth surface and the first internal electrode are spaced apart from each other, in the second direction.

11. The multilayer electronic component of claim 1, wherein the second surface comprises third and fourth band electrodes disposed to be spaced apart from each other, and
the third band electrode is connected to the first external electrode, and the fourth band electrode is connected to the second external electrode.

12. The multilayer electronic component of claim 11, wherein the first plating layer is further disposed on the third band electrode, and the second plating layer is further disposed on the fourth band electrode.

13. The multilayer electronic component of claim 1, wherein a maximum size of the multilayer electronic component in the second direction is 1.1 mm or less, and a maximum size of the multilayer electronic component in the third direction is 0.55 mm or less.

14. The multilayer electronic component of claim 1, wherein the dielectric layer has an average thickness of 0.35 µm or less.

15. The multilayer electronic component of claim 1, wherein the first and second internal electrodes have an average thickness of 0.35 µm or less.

16. The multilayer electronic component of claim 1, wherein the body comprises a capacitance formation portion, including the first and second internal electrodes alternately disposed with the dielectric layer interposed therebetween, and a cover portion disposed on both end surfaces of the capacitance formation portion in the first direction, and
an average size of the cover portion in a first direction is 15 µm or less.

17. The multilayer electronic component of claim 1, wherein the body comprises a 1-3 corner connecting the first and third surfaces, a 1-4 corner connecting the first and fourth surfaces, a 2-3 corner connecting the second and third surfaces, and a 2-4 corner connecting the second and fourth surfaces, the 1-3 corner and the 2-3 corner have a form contracted to a center of the body in the first direction, toward the third surface, and the 1-4 corner and the 2-4 corner have a form contracted to the center of the body in the first direction, toward the fourth surface, and the first external electrode comprises a corner portion disposed on the 1-3 corner and the 2-3 corner, and the second external electrode comprises a corner portion disposed on the 1-4 corner and the 2-4 corner.

18. The multilayer electronic component of claim 1, wherein the first and second external electrodes are disposed to be spaced apart from the fifth and sixth surfaces.

19. The multilayer electronic component of claim 1, wherein the first and second external electrodes are disposed to be spaced apart from the first and second surfaces.

20. The multilayer electronic component of claim 1, wherein the first and second external electrodes comprise at least one of Ni and a Ni alloy.

21. The multilayer electronic component of claim 1, further comprising:

an additional insulating layer disposed on the first surface and disposed between the first plating layer and the second plating layer.

22. The multilayer electronic component of claim 1, further comprising:
a first insulating layer disposed on the first external electrode, and a second insulating layer disposed on the second external electrode.

23. The multilayer electronic component of claim 22, wherein H1>H2 is satisfied, in which H1 is an average size from the first surface to an internal electrode disposed to be closest to the first surface, among the first and second internal electrodes, in the first direction, and H2 is an average size from an extension line of the first surface to ends of the first and second plating layers disposed on the first and second external electrodes, in the first direction.

24. The multilayer electronic component of claim 22, wherein H1<H2 is satisfied, in which H1 is an average size from the first surface to an internal electrode disposed to be closest to the first surface, among the first and second internal electrodes, in the first direction, and H2 is an average size from an extension line of the first surface to ends of the first and second plating layers disposed on the first and second external electrodes, in the first direction.

25. The multilayer electronic component of claim 24, wherein H2<T/2 is satisfied, in which T is an average size of the body in the first direction.

26. The multilayer electronic component of claim 22, wherein the first and second plating layers are disposed on a level the same as or lower than a level of an extension line of the first surface.

27. The multilayer electronic component of claim 22, further comprising:
an additional insulating layer disposed on the first surface and disposed between the first plating layer and the second plating layer.

28. The multilayer electronic component of claim 22, wherein an average thickness of the first and second plating layers is thinner than an average thickness of the first and second insulating layers.

29. The multilayer electronic component of claim 22, wherein the first plating layer is disposed to cover an end, disposed on the first external electrode, of the first insulating layer, and the second plating layer is disposed to cover an end, disposed on the second external electrode, of the second insulating layer.

30. The multilayer electronic component of claim 22, wherein the first insulating layer is disposed to cover an end, disposed on the first external electrode, of the first plating layer, and the second insulating layer is disposed to cover an end, disposed on the second external electrode, of the second plating layer.

31. The multilayer electronic component of claim 22, wherein the first and second insulating layers extend to the fifth and sixth surfaces and are connected to each other, and are disposed to cover a portion of the fifth and sixth surfaces.

32. The multilayer electronic component of claim 22, wherein the first and second insulating layers extend to the fifth and sixth surfaces and are connected to each other, and are disposed to cover an entirety of the fifth and sixth surfaces.

33. The multilayer electronic component of claim 22, wherein the first and second insulating layers extend to the second surface and are connected to each other.

\* \* \* \* \*